(12) United States Patent
Li et al.

(10) Patent No.: US 11,409,039 B2
(45) Date of Patent: Aug. 9, 2022

(54) WAVEGUIDE MODE EXPANDER HAVING NON-CRYSTALLINE SILICON FEATURES

(71) Applicant: Skorpios Technologies, Inc., Albuquerque, NM (US)

(72) Inventors: Guoliang Li, Albuquerque, NM (US); Damien Lambert, Los Altos, CA (US); Nikhil Kumar, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 16/985,860

(22) Filed: Aug. 5, 2020

(65) Prior Publication Data

US 2021/0116640 A1  Apr. 22, 2021

Related U.S. Application Data

(60) Continuation of application No. 16/428,193, filed on May 31, 2019, now Pat. No. 10,768,369, which is a (Continued)

(51) Int. Cl.
*G02B 6/12* (2006.01)
*G02B 6/14* (2006.01)
(Continued)

(52) U.S. Cl.
CPC ............ *G02B 6/14* (2013.01); *G02B 6/1228* (2013.01); *G02B 6/132* (2013.01); *G02B 6/136* (2013.01); *G02B 6/305* (2013.01); *G02B 2006/12038* (2013.01); *G02B 2006/12061* (2013.01); *G02B 2006/12097* (2013.01); *G02B 2006/12147* (2013.01); *G02B 2006/12152* (2013.01)

(58) Field of Classification Search
None
See application file for complete search history.

(56) References Cited

U.S. PATENT DOCUMENTS 3,905,676 A  9/1975  Ulrich
4,182,545 A  1/1980  Greer
(Continued)

FOREIGN PATENT DOCUMENTS

CN     1246928      3/2000
CN     101637007    1/2010
(Continued)

OTHER PUBLICATIONS

Lumerical Knowledge Base; "Evanescent Waveguide Couplers"; Web. Mar. 6, 2015; <https://kb.lumerical.com/en/pic_passive_waveguide_couplers_evanescent.html>.
(Continued)

*Primary Examiner* — Michael Stahl
(74) *Attorney, Agent, or Firm* — Kilpatrick Townsend & Stockton LLP

(57) ABSTRACT

A waveguide mode expander couples a smaller optical mode in a semiconductor waveguide to a larger optical mode in an optical fiber. The waveguide mode expander comprises a shoulder and a ridge. In some embodiments, the ridge of the waveguide mode expander has a plurality of stages, the plurality of stages having different widths at a given cross section.

20 Claims, 20 Drawing Sheets

Related U.S. Application Data continuation of application No. 15/980,536, filed on May 15, 2018, now Pat. No. 10,345,521, which is a continuation of application No. 15/487,918, filed on Apr. 14, 2017, now Pat. No. 10,001,600, which is a division of application No. 14/722,983, filed on May 27, 2015, now Pat. No. 9,658,401, said application No. 15/980,536 is a division of application No. 14/722,970, filed on May 27, 2015, now Pat. No. 9,885,832.

(60) Provisional application No. 62/044,867, filed on Sep. 2, 2014, provisional application No. 62/003,404, filed on May 27, 2014.

(51) Int. Cl.
*G02B 6/122* (2006.01)
*G02B 6/132* (2006.01)
*G02B 6/136* (2006.01)
*G02B 6/30* (2006.01)

(56) References Cited

U.S. PATENT DOCUMENTS

| | | |
|---|---|---|
| 4,199,222 A | 4/1980 | Ikushima et al. |
| 4,293,826 A | 10/1981 | Scifres et al. |
| 4,389,567 A | 6/1983 | Khoe et al. |
| 4,423,922 A | 1/1984 | Porter |
| 4,799,749 A | 1/1989 | Borner et al. |
| 4,886,538 A | 12/1989 | Mahapatra |
| 4,889,406 A | 12/1989 | Sezerman |
| 4,932,032 A | 6/1990 | Koch et al. |
| 5,190,883 A | 3/1993 | Menigaux et al. |
| 5,260,567 A | 11/1993 | Kuroda et al. |
| 5,319,667 A | 6/1994 | Dutting et al. |
| 5,333,219 A | 7/1994 | Kuznetsov |
| 5,454,058 A | 9/1995 | Mace et al. |
| 5,579,424 A | 11/1996 | Schneider |
| 5,586,209 A | 12/1996 | Matsuura et al. |
| 5,633,512 A | 5/1997 | Okuda et al. |
| 5,745,614 A | 4/1998 | Kersten et al. |
| 5,818,989 A | 10/1998 | Nakamura |
| 5,838,070 A | 11/1998 | Naruse et al. |
| 5,858,814 A | 1/1999 | Goossen et al. |
| 5,981,400 A | 11/1999 | Lo |
| 5,987,046 A | 11/1999 | Kobayashi et al. |
| 5,987,050 A | 11/1999 | Doerr et al. |
| 6,041,071 A | 3/2000 | Tayebati |
| 6,101,210 A | 8/2000 | Bestwick et al. |
| 6,108,478 A | 8/2000 | Harpin et al. |
| 6,118,978 A | 9/2000 | Ihmels |
| 6,192,058 B1 | 2/2001 | Abeles |
| 6,229,792 B1 | 5/2001 | Anderson et al. |
| 6,229,947 B1 | 5/2001 | Vawter et al. |
| 6,310,995 B1 | 10/2001 | Saini et al. |
| 6,316,281 B1 | 11/2001 | Lee et al. |
| 6,339,606 B1 | 1/2002 | Alphonse |
| 6,480,327 B1 | 11/2002 | Betin |
| 6,483,098 B1 | 11/2002 | Kato et al. |
| 6,509,139 B1 | 1/2003 | Roberts et al. |
| 6,571,039 B1 | 5/2003 | Al-hemyari et al. |
| 6,690,857 B2 | 2/2004 | Zhao et al. |
| 6,714,566 B1 | 3/2004 | Coldren et al. |
| 6,728,279 B1 | 4/2004 | Sarlet et al. |
| 6,768,855 B1 | 7/2004 | Bakke et al. |
| 6,788,721 B2 | 9/2004 | Yang et al. |
| 6,829,561 B2 | 12/2004 | Keller et al. |
| 6,846,694 B2 | 1/2005 | Fukushima et al. |
| 6,888,989 B1 | 5/2005 | Zhou et al. |
| 6,931,178 B2 | 8/2005 | Saccomanno |
| 6,980,720 B2 * | 12/2005 | Gothoskar ............ G02B 6/1228 385/129 |
| 7,005,247 B1 | 2/2006 | Fong et al. |
| 7,006,746 B2 | 2/2006 | Blalock et al. |
| 7,016,560 B2 | 3/2006 | Ticknor et al. |
| 7,058,096 B2 | 6/2006 | Sarlet et al. |
| 7,082,235 B2 | 7/2006 | Gunn, III |
| 7,120,336 B2 | 10/2006 | Sandhu et al. |
| 7,257,283 B1 | 8/2007 | Liu et al. |
| 7,317,853 B2 | 1/2008 | Laurent-Lund et al. |
| 7,323,353 B2 | 1/2008 | Sandhu et al. |
| 7,326,611 B2 | 2/2008 | Forbes |
| 7,359,593 B2 | 4/2008 | Little |
| 7,359,607 B2 | 4/2008 | Blalock et al. |
| 7,392,247 B2 | 6/2008 | Chen et al. |
| 7,464,147 B1 | 12/2008 | Fakhouri et al. |
| 7,519,257 B2 | 4/2009 | Lipson et al. |
| 7,531,395 B2 | 5/2009 | Blomiley et al. |
| 7,539,373 B1 | 5/2009 | Logvin et al. |
| 7,598,527 B2 | 10/2009 | Behfar et al. |
| 7,633,988 B2 | 12/2009 | Fish et al. |
| 7,701,985 B2 | 4/2010 | Webster et al. |
| 7,720,341 B2 | 5/2010 | Blalock et al. |
| 7,796,656 B2 | 9/2010 | Watson et al. |
| 7,831,116 B2 | 11/2010 | Kim et al. |
| 7,936,955 B2 | 5/2011 | Blalock et al. |
| 7,939,934 B2 | 5/2011 | Haba et al. |
| 7,972,875 B2 | 7/2011 | Rogers et al. |
| 8,025,444 B2 | 9/2011 | Choi et al. |
| 8,106,379 B2 | 1/2012 | Bowers |
| 8,164,748 B1 | 4/2012 | Flanders et al. |
| 8,170,383 B2 | 5/2012 | Tokushima |
| 8,195,020 B2 | 6/2012 | Sandhu et al. |
| 8,222,084 B2 | 7/2012 | Dallesasse et al. |
| 8,254,735 B2 | 8/2012 | Tsai |
| 8,271,205 B2 | 9/2012 | Reja et al. |
| 8,290,014 B2 | 10/2012 | Junesand et al. |
| 8,320,721 B2 | 11/2012 | Cevini et al. |
| 8,368,995 B2 | 2/2013 | Dallesasse et al. |
| 8,445,326 B2 | 5/2013 | Dallesasse et al. |
| 8,483,528 B2 | 7/2013 | Socci et al. |
| 8,488,923 B2 | 7/2013 | Na et al. |
| 8,542,763 B2 | 9/2013 | Forenza et al. |
| 8,559,470 B2 | 10/2013 | Dallesasse et al. |
| 8,605,766 B2 | 12/2013 | Dallesasse et al. |
| 8,611,388 B2 | 12/2013 | Krasulick et al. |
| 8,615,025 B2 | 12/2013 | Dallesasse et al. |
| 8,620,230 B2 | 12/2013 | Sanderovitz et al. |
| 8,630,326 B2 | 1/2014 | Krasulick et al. |
| 8,722,464 B2 | 5/2014 | Dallesasse et al. |
| 8,859,394 B2 | 10/2014 | Dallesasse et al. |
| 9,042,697 B2 | 5/2015 | Sandhu et al. |
| 9,075,192 B2 | 7/2015 | Adams |
| 9,097,846 B2 | 8/2015 | Mizrahi et al. |
| 9,159,631 B2 | 10/2015 | Marchena |
| 9,195,001 B2 | 11/2015 | Hatori et al. |
| 9,252,564 B2 | 2/2016 | Chaouch et al. |
| 9,268,088 B2 | 2/2016 | Mizrahi et al. |
| 9,279,750 B2 | 3/2016 | Cremins et al. |
| 9,316,785 B2 | 4/2016 | Krasulick et al. |
| 9,348,099 B2 | 5/2016 | Krishnamurthi et al. |
| 9,354,396 B2 | 5/2016 | Baudot |
| 9,429,693 B2 | 8/2016 | Takahashi |
| 9,465,163 B2 | 10/2016 | Kumar et al. |
| 9,529,151 B2 | 12/2016 | Goi et al. |
| 9,606,291 B2 | 3/2017 | Ellis-Monaghan et al. |
| 9,625,641 B2 | 4/2017 | Gourlay |
| 9,658,401 B2 | 5/2017 | Li et al. |
| 9,659,993 B2 | 5/2017 | Dallesasse et al. |
| 9,664,855 B2 | 5/2017 | Sodagar et al. |
| 9,829,631 B2 | 11/2017 | Lambert |
| 9,885,832 B2 | 2/2018 | Lambert et al. |
| 9,933,575 B2 | 4/2018 | Kumar et al. |
| 9,977,188 B2 | 5/2018 | Lambert et al. |
| 10,001,600 B2 | 6/2018 | Li et al. |
| 10,088,629 B2 | 10/2018 | Sodagar et al. |
| 10,132,996 B2 | 11/2018 | Lambert |
| 10,209,451 B2 | 2/2019 | Kumar et al. |
| 10,295,746 B2 | 5/2019 | Sodagar et al. |
| 10,345,521 B2 | 7/2019 | Li et al. |
| 10,768,369 B2 | 9/2020 | Li et al. |
| 10,895,686 B2 | 1/2021 | Lambert et al. |
| 2001/0010743 A1 | 8/2001 | Cayrefourcq et al. |

(56) References Cited

U.S. PATENT DOCUMENTS

| | | |
|---|---|---|
| 2001/0026670 A1 | 10/2001 | Takizawa et al. |
| 2002/0064337 A1 | 5/2002 | Behin et al. |
| 2002/0097962 A1 | 7/2002 | Yoshimura et al. |
| 2002/0197013 A1 | 12/2002 | Liu et al. |
| 2003/0035446 A1 | 2/2003 | Griffel |
| 2003/0042494 A1 | 3/2003 | Worley |
| 2003/0081877 A1 | 5/2003 | Nakata et al. |
| 2003/0081887 A1 | 5/2003 | Karpinsky et al. |
| 2003/0128724 A1 | 7/2003 | Morthier |
| 2003/0129660 A1 | 7/2003 | Zien et al. |
| 2003/0169968 A1 | 9/2003 | Bazylenko et al. |
| 2003/0210725 A1 | 11/2003 | Prassas et al. |
| 2003/0215189 A1* | 11/2003 | Lee ................ G02B 6/2813 385/50 |
| 2004/0017962 A1 | 1/2004 | Lee et al. |
| 2004/0022223 A1 | 2/2004 | Billhartz |
| 2004/0037342 A1 | 2/2004 | Blauvelt et al. |
| 2004/0057667 A1* | 3/2004 | Yamada ............. G02B 6/1228 385/43 |
| 2004/0062485 A1 | 4/2004 | Kelly et al. |
| 2004/0066999 A1 | 4/2004 | Sakamoto et al. |
| 2004/0077135 A1 | 4/2004 | Fan et al. |
| 2004/0111397 A1 | 6/2004 | Chen et al. |
| 2004/0114872 A1 | 6/2004 | Nagai |
| 2004/0120646 A1 | 6/2004 | Fushimi et al. |
| 2004/0120675 A1 | 6/2004 | Skinner et al. |
| 2004/0165812 A1 | 8/2004 | Blauvelt et al. |
| 2004/0182914 A1 | 9/2004 | Venugopalan |
| 2004/0228384 A1 | 11/2004 | Oh et al. |
| 2004/0245425 A1 | 12/2004 | Delpiano et al. |
| 2004/0258360 A1 | 12/2004 | Lim et al. |
| 2004/0259279 A1 | 12/2004 | Erchak et al. |
| 2004/0264833 A1* | 12/2004 | McIntyre .......... G02B 6/12002 385/14 |
| 2004/0264840 A1 | 12/2004 | Mule et al. |
| 2005/0033858 A1 | 2/2005 | Swildens et al. |
| 2005/0058416 A1 | 3/2005 | Hoon Lee et al. |
| 2005/0082552 A1 | 4/2005 | Fang et al. |
| 2005/0105853 A1 | 5/2005 | Liu et al. |
| 2005/0117844 A1 | 6/2005 | Abeles et al. |
| 2005/0123244 A1 | 6/2005 | Block et al. |
| 2005/0185893 A1 | 8/2005 | Liu |
| 2005/0202554 A1 | 9/2005 | Luo et al. |
| 2005/0211465 A1 | 9/2005 | Sunohara et al. |
| 2005/0211993 A1 | 9/2005 | Sano et al. |
| 2005/0213618 A1 | 9/2005 | Sochava et al. |
| 2005/0226284 A1 | 10/2005 | Tanaka et al. |
| 2005/0286426 A1 | 12/2005 | Padhye et al. |
| 2006/0002443 A1 | 1/2006 | Farber et al. |
| 2006/0045157 A1 | 3/2006 | Ratowsky et al. |
| 2006/0062535 A1* | 3/2006 | Madsen ............ G02B 6/12002 385/129 |
| 2006/0093002 A1 | 5/2006 | Park et al. |
| 2006/0104322 A1 | 5/2006 | Park et al. |
| 2006/0109542 A1 | 5/2006 | Mizuuchi et al. |
| 2006/0115215 A1 | 6/2006 | Liu |
| 2006/0285797 A1 | 12/2006 | Little |
| 2007/0002924 A1 | 1/2007 | Hutchinson et al. |
| 2007/0147762 A1* | 6/2007 | Kwakernaak ........... H01S 5/026 385/131 |
| 2007/0172189 A1 | 7/2007 | Koehl et al. |
| 2007/0223549 A1 | 9/2007 | Livshits et al. |
| 2007/0280326 A1 | 12/2007 | Piede et al. |
| 2008/0002928 A1 | 1/2008 | Li |
| 2008/0266639 A1 | 10/2008 | Melloni et al. |
| 2009/0016399 A1 | 1/2009 | Bowers |
| 2009/0020499 A1 | 1/2009 | Nottola et al. |
| 2009/0087137 A1 | 4/2009 | Doan |
| 2009/0135861 A1 | 5/2009 | Webster et al. |
| 2009/0225796 A1 | 9/2009 | Kato |
| 2009/0267173 A1 | 10/2009 | Takahashi et al. |
| 2009/0278233 A1 | 11/2009 | Pinnington et al. |
| 2009/0294803 A1 | 12/2009 | Nuzzo et al. |
| 2009/0297093 A1 | 12/2009 | Webster et al. |
| 2009/0310140 A1 | 12/2009 | Smith et al. |
| 2010/0040327 A1 | 2/2010 | Deki et al. |
| 2010/0042668 A1 | 2/2010 | Liang et al. |
| 2010/0086256 A1 | 4/2010 | Ben Bakir et al. |
| 2010/0111128 A1 | 5/2010 | Qin et al. |
| 2010/0114846 A1 | 5/2010 | LaChapelle et al. |
| 2010/0123145 A1 | 5/2010 | Lee |
| 2010/0238855 A1 | 9/2010 | Yoshida et al. |
| 2010/0247031 A1 | 9/2010 | Hayakawa et al. |
| 2010/0247037 A1 | 9/2010 | Little |
| 2010/0266288 A1 | 10/2010 | Little et al. |
| 2010/0272385 A1 | 10/2010 | Akiyama |
| 2010/0302992 A1 | 12/2010 | Zhuang |
| 2011/0012261 A1 | 1/2011 | Choi et al. |
| 2011/0032964 A1 | 2/2011 | Sauer et al. |
| 2011/0044193 A1 | 2/2011 | Forenza et al. |
| 2011/0085572 A1 | 4/2011 | Dallesasse et al. |
| 2011/0085577 A1 | 4/2011 | Krasulick et al. |
| 2011/0085760 A1 | 4/2011 | Han et al. |
| 2011/0089524 A1 | 4/2011 | Nonogaki |
| 2011/0158584 A1 | 6/2011 | Popovic |
| 2011/0163444 A1 | 7/2011 | Hayashi |
| 2011/0165707 A1 | 7/2011 | Lott et al. |
| 2011/0205660 A1 | 8/2011 | Komura et al. |
| 2011/0211604 A1 | 9/2011 | Roscher |
| 2011/0216997 A1 | 9/2011 | Gothoskar et al. |
| 2011/0217002 A1 | 9/2011 | Mekis et al. |
| 2011/0267676 A1 | 11/2011 | Dallesasse et al. |
| 2012/0001166 A1 | 1/2012 | Doany et al. |
| 2012/0002694 A1 | 1/2012 | Bowers et al. |
| 2012/0002931 A1 | 1/2012 | Watanabe |
| 2012/0057079 A1 | 3/2012 | Dallesasse et al. |
| 2012/0057609 A1 | 3/2012 | Dallesasse et al. |
| 2012/0057610 A1 | 3/2012 | Dallesasse et al. |
| 2012/0057816 A1 | 3/2012 | Krasulick et al. |
| 2012/0091594 A1 | 4/2012 | Landesberger et al. |
| 2012/0093456 A1 | 4/2012 | Taillaert et al. |
| 2012/0120978 A1 | 5/2012 | Budd et al. |
| 2012/0149148 A1 | 6/2012 | Dallesasse et al. |
| 2012/0170931 A1 | 7/2012 | Evans et al. |
| 2012/0189317 A1 | 7/2012 | Heck et al. |
| 2012/0224813 A1 | 9/2012 | Chen et al. |
| 2012/0230635 A1 | 9/2012 | Yoshida |
| 2012/0264256 A1 | 10/2012 | Dallesasse et al. |
| 2012/0294321 A1 | 11/2012 | Ma et al. |
| 2012/0320939 A1 | 12/2012 | Baets et al. |
| 2013/0022312 A1 | 1/2013 | Taillaert et al. |
| 2013/0037905 A1 | 2/2013 | Shubin et al. |
| 2013/0051727 A1 | 2/2013 | Mizrahi et al. |
| 2013/0107741 A1 | 5/2013 | Huang et al. |
| 2013/0114924 A1 | 5/2013 | Loh et al. |
| 2013/0170793 A1 | 7/2013 | Ushida et al. |
| 2013/0209033 A1 | 8/2013 | Luff et al. |
| 2013/0210214 A1 | 8/2013 | Dallesasse et al. |
| 2013/0216177 A1 | 8/2013 | Tseng et al. |
| 2013/0251299 A1 | 9/2013 | He et al. |
| 2013/0301975 A1 | 11/2013 | Spann et al. |
| 2013/0302920 A1 | 11/2013 | Dallesasse et al. |
| 2014/0064658 A1 | 3/2014 | Ramaswamy et al. |
| 2014/0133817 A1 | 5/2014 | Lealman et al. |
| 2014/0179036 A1 | 6/2014 | Krasulick et al. |
| 2014/0233593 A1 | 8/2014 | Qureshi |
| 2014/0252411 A1 | 9/2014 | Kang et al. |
| 2014/0270620 A1 | 9/2014 | Anderson et al. |
| 2014/0319656 A1 | 10/2014 | Marchena et al. |
| 2015/0010266 A1* | 1/2015 | Webster ............ G02B 6/1228 385/14 |
| 2015/0043002 A1 | 2/2015 | Kuznetsov et al. |
| 2015/0097211 A1 | 4/2015 | Krasulick et al. |
| 2015/0184994 A1 | 7/2015 | Flanders |
| 2015/0219853 A1 | 8/2015 | Kumar et al. |
| 2015/0234124 A1 | 8/2015 | Won et al. |
| 2015/0253471 A1 | 9/2015 | Takahashi |
| 2015/0253472 A1 | 9/2015 | Kumar et al. |
| 2015/0288141 A1 | 10/2015 | Fallahi et al. |
| 2015/0316723 A1 | 11/2015 | Taylor et al. |
| 2015/0346429 A1 | 12/2015 | Lambert et al. |
| 2015/0346430 A1 | 12/2015 | Li et al. |
| 2015/0362673 A1 | 12/2015 | Zheng et al. |

(56) References Cited

U.S. PATENT DOCUMENTS

| | | | | |
|---|---|---|---|---|
| 2016/0139334 A1* | 5/2016 | Sakakibara | ........ | G02B 6/12002 385/43 |
| 2016/0170142 A1 | 6/2016 | Lambert et al. | | |
| 2016/0306111 A1 | 10/2016 | Lambert | | |
| 2016/0327742 A1* | 11/2016 | Collins | ................. | G02B 6/125 |
| 2016/0356960 A1* | 12/2016 | Novack | ................. | G02B 6/305 |
| 2017/0090118 A1 | 3/2017 | Sodagar et al. | | |
| 2017/0230117 A1 | 8/2017 | Li et al. | | |
| 2017/0242192 A1 | 8/2017 | Sodagar et al. | | |
| 2017/0307648 A1 | 10/2017 | Kotake et al. | | |
| 2017/0351028 A1 | 12/2017 | Li et al. | | |
| 2018/0196197 A1 | 7/2018 | Sodagar et al. | | |
| 2018/0356596 A1 | 12/2018 | Kumar et al. | | |

FOREIGN PATENT DOCUMENTS

| | | |
|---|---|---|
| CN | 101641622 | 2/2010 |
| CN | 102159975 | 8/2011 |
| CN | 203241564 | 10/2013 |
| EP | 0696747 | 2/1996 |
| EP | 2141525 | 1/2010 |
| EP | 2544319 | 1/2013 |
| EP | 2648906 | 10/2013 |
| EP | 2751603 | 7/2014 |
| JP | 09197179 | 7/1997 |
| JP | 2000089054 | 3/2000 |
| JP | 2003078530 | 3/2003 |
| JP | 2006186446 | 7/2006 |
| JP | 2007074202 | 3/2007 |
| JP | 2008147209 | 6/2008 |
| JP | 2010522372 | 7/2010 |
| JP | 2010199972 | 9/2010 |
| JP | 2010281899 | 12/2010 |
| JP | 2011033963 | 2/2011 |
| JP | 2011075917 | 4/2011 |
| JP | 2013507792 | 3/2013 |
| JP | 2014525608 | 9/2014 |
| KR | 1020140060547 | 5/2014 |
| KR | 1020140060548 | 5/2014 |
| TW | 201140975 | 11/2011 |
| WO | 03012512 | 2/2003 |
| WO | 2005017592 | 2/2005 |
| WO | 2007139316 | 12/2007 |
| WO | 2009005544 | 1/2009 |
| WO | 2010033435 | 3/2010 |
| WO | 2011019887 | 2/2011 |
| WO | 2011046898 | 4/2011 |
| WO | 2012078361 | 6/2012 |
| WO | 2013033252 | 3/2013 |
| WO | 2013109955 | 7/2013 |
| WO | 2014021411 | 2/2014 |
| WO | 2014025824 | 2/2014 |
| WO | 2014176561 | 10/2014 |
| WO | 2015054491 | 4/2015 |

OTHER PUBLICATIONS

Analui et al.; "A Fully Integrated 20-GB/s Optoelectronic Transceiver Implemented in a Standard 0.13-mu-m CMOS SOI Technology", IEEE Journal of Solid State Circuits, vol. 41, No. 12, Dec. 2006, retrieved from the Internet <http://ieeexplore.ieee.org/xpls/abs_all.jsp?arnumber=4014595&tag=1>, 11 pages.
Barkai, et al.; "Efficient Mode Converter for Coupling between Fiber and Micrometer Size Silicon Waveguides"; *2007 4th IEEE International Conference on Group IV Photonics* (2007): pp. 49-51.
Coldren et al.; "Tunable Semiconductor Lasers: A Tutorial"; Journal of Lightwave Technology, Jan. 2004; 22(1):193-202.
Coldren; "Monolithic Tunable Diode Lasers"; IEEE Journal on Selected Topics in Quantum Electronics, Nov./Dec. 2000; 6(6):988-999.
Hildebrand, et al.; "The Y-Laser: A Multifunctional Device for Optical Communication Systems and Switching Networks"; Journal of Lightwave Technology, Dec. 1993; 11(12):2066-2075.

Isaksson, et al.; "10 GB/s Direct Modulation of 40 nm Tunable Modulated-Grating Y-branch Laser"; in Optical Fiber Communication Conference and Exposition and the National Fiber Optic Engineers Conference, Technical Digest (CD) (Optical Society of America, 2005), paper OTuE2.
Khilo, et al.; "Efficient Planar Fiber-to-Chip Coupler Based on Two-Stage Adiabatic Evolution"; *Optics Express* 18.15 (2010): pp. 15790-15806.
Kuznetsov, et al.; "Asymmetric Y-Branch Tunable Semiconductor Laser with 1.0 THz Tuning Range"; IEEE Photonics Technology Letters, Oct. 1992; 4(10):1093-1095.
Laroy, et al.; "Characteristics of the New Modulated Grating Y laser (MG-Y) for Future WDM Networks"; Proceedings Symposium IEEE/LEOS Benelux Chapter, 2003, Enschede, pp. 55-58, retrieved from the Internet: <http://leosbenelux.org/symp03/s03p055.pdf>.
Laroy; "New Concepts of Wavelength Tunable Laser Diodes For Future Telecom Networks"; [dissertation] Universiteit Gent, 2006 [in Dutch and English], 162 pages.
LAROY; "New Widely Tunable Laser Concepts For Future Telecommunication Networks"; FTW-symposium, Belgium, 2002; retrieved from the Internet: <http://photonics.intec.ugent.be/download/pub_1625.pdf>, 2 pages total.
Magno, et al.; "Multiphysics Investigation of Thermo-optic Effect in Silicon-on-Insulator Waveguide Arrays"; Excerpt from the Proceedings of the COMSOL Users Conference 2006, retrieved from the Internet: <http://cds.comsol.com/access/dl/papers/1628/Magno.pdf>, 6 pages total.
Morthier, et al.; "New Widely Tunable Edge-Emitting Laser Diodes at 1.55 μm Developed in the European IST-project NEWTON"; Semiconductor and Organic Optoelectronic Materials and Devices. Edited by Zah, Chung-En; Luo, Yi; Tsuji, Shinji. Proceedings of the SPIE, 2005; 5624:1-8; retrieved from the Internet: <http://photonics.intec.ugent.be/download/pub_1800.pdf>.
Morthier; "Advanced Widely Tunable Edge-Emitting Laser Diodes and Their Application in Optical Communications"; [presentation], Ghent University - IMEC, 2000, 23 pages total. Can be retrieved from the Internet: <broadband02.ici.ro/program/morthier_3a.ppt>.
MORTHIER; "New Widely Tunable Lasers for Optical Networks"; Newton Project No. IST-2000-28244, Dec. 2001; retrieved from the Internet: <http://www.ist-optimist.unibo.it/pdf/network/projects_public/NEWTON/Deliverables/D01.pdf>, 5 pages total.
Park, et al.; "A Fiber-to-Chip Coupler Based on Si/SiON Cascaded Tapers for Si Photonic Chips." *Optics Express* 21.24 (2013): pp. 29313-29319.
Passaro, et al.; "Investigation of Thermo-Optic Effect and Multireflector Tunable Filter/Multiplexer in SOI Waveguides"; Optics Express, May 2, 2005; 13(9):3429-3437.
Wesström, et al.; "Design of a Widely Tunable Modulated Grating Y-branch Laser Using the Additive Vernier Effect for Improved Super-Mode Selection"; IEEE 18th International Semiconductor Laser Conference, 2002, 99-100; retrieved from the Internet <http://photonics.intec.ugent.be/download/pub_1603.pdf>.
Wesström, et al.; "State-of-the-Art Performance of Widely Tunable Modulated Grating Y-Branch Lasers"; Optical Fiber Communication Conference, Technical Digest (CD) (Optical Society of America, 2004), paper TuE2.
Yamada; "Chapter 1: Silicon Photonic Wire Waveguides: Fundamentals and Applications"; Silicon Photonics II, Topics in Applied Physics 119 (2011); pp. 1-29.
CN201580016484.1 received a Third Office Action dated Sep. 12, 2019, 14 pages.
CN201580016484.1 received an Office Action, dated Mar. 21, 2019, 12 pages.
International Preliminary Report on Patentability dated Mar. 13, 2014 for International Patent Application No. PCT/US2012/052913, all pages.
International Search Report and Written Opinion dated Nov. 16, 2012 for International Patent Application No. PCT/US2012/052913, all pages.
International Search Report and Written Opinion, dated Jan. 22, 2015, for International Patent Application No. PCT/US2014/059900, all pages.

(56) References Cited

OTHER PUBLICATIONS

International Search Report on Patentability, dated Apr. 21, 2016, for International Patent Application No. PCT/US2014/059900, all pages.
International Preliminary Report on Patentability, dated Aug. 18, 2016, for International Patent Application No. PCT/US2015/014801, all pages.
International Search Report and Written Opinion, dated May 11, 2015, for International Patent Application No. PCT/US2015/014801, all pages.
International Preliminary Report on Patentability, dated Sep. 22, 2016, for International Patent Application No. PCT/US2015/019430, all pages.
International Search Report and Written Opinion, dated May 29, 2015, for International Patent Application No. PCT/US2015/019430, all pages.
International Preliminary Report on Patentability dated Dec. 8, 2016 for International Patent Application No. PCT/US2015/032725, all pages.
International Search Report and Written Opinion dated Aug. 27, 2015 for International Patent Application No. PCT/US2015/032725, all pages.
Non-Final Office Action dated Sep. 2, 2014 for U.S. Appl. No. 13/597,117; all pages.
Selected file history U.S. Appl. No. 14/642,429, filed Mar. 9, 2015, all pages.
Non-Final Office Action dated Jan. 26, 2017 for U.S. Appl. No. 14/722,970, filed May 27, 2015; all pages.
Notice of Allowance dated Sep. 27, 2017 for U.S. Appl. No. 14/772,970; 6 pages.
Non-Final Office Action dated Jan. 26, 2017 for U.S. Appl. No. 14/722,970, 6 pages.
Notice of Allowance dated Jan. 18, 2017, for U.S. Appl. No. 14/722,983, 9 pages.
Supplemental Notice of Allowance dated Feb. 1, 2017, for U.S. Appl. No. 14/722,983, 2 pages.
Notice of Allowance dated Jan. 19, 2018 for U.S. Appl. No. 15/051,348, 5 pages.
Restriction Requirement dated Dec. 27, 2016 for U.S. Appl. No. 15/051,348; all pages.
Non-Final Office Action dated Mar. 7, 2017 for U.S. Appl. No. 15/138,898; all pages.
Notice of Allowance dated Jul. 26, 2017 for U.S. Appl. No. 15/133,898; all pages.
Restriction Requirement dated Oct. 6, 2016 for U.S. Appl. No. 15/133,898; all pages.
Final Office Action dated Feb. 13, 2018, for U.S. Appl. No. 15/133,928; all pages.
Non-Final Office Action dated Jun. 18, 3017 for U.S. Appl. No. 18/133,920; all pages.
Non-Final Office Action dated Oct. 6, 2016 for U.S. Appl. No. 15/133,920; all pages.
Notice of Allowance dated Jul. 16, 2018 for U.S. Appl. No. 15/133,920; all pages.
Notice of Allowance dated Jan. 25, 2017 for U.S. Appl. No. 15/262,937; all pages.
Notice of Allowance dated Feb. 14, 2013 for U.S. Appl. No. 15/487,918; all pages.
Final Office Action dated Jan. 17, 2018 for U.S. Appl. No. 15/588,128; all pages.
Non-Final Office Action dated Jun. 2, 2017 for U.S. Appl. No. 15/588,128; all pages.
Notice of Allowance dated May 29, 2018, for U.S. Appl. No. 15/588,128; all pages.
First Action Interview Office Action Summary dated Oct. 8, 2019, for U.S. Appl. No. 15/968,454, 5 pages.
First Action Interview Pilot Program Pre-Interview Communication dated Jul. 1, 2019, for U.S. Appl. No. 15/968,454, 5 pages.
Non-Final Office Action dated Apr. 20, 2020, for U.S. Appl. No. 15/968,454, 7 pages.
Notice of Allowance dated Sep. 16, 2020, for U.S. Appl. No. 15/968,454, 5 pages.
Non-Final Office Action dated Sep. 28, 2018 for U.S. Appl. No. 15/980,536; all pages.
Notice of Allowance dated Feb. 28, 2019, for U.S. Appl. No. 15/988,536; all pages.
Notice of Allowance dated Jan. 9, 2019, for U.S. Appl. No. 16/115,104; all pages.
Notice of Allowance dated May 5, 2020, for U.S. Appl. No. 16/428,193, 9 pages.
European Application No. EP15800295.6 received an office Action dated Nov. 26, 2021, 7 pages.

* cited by examiner

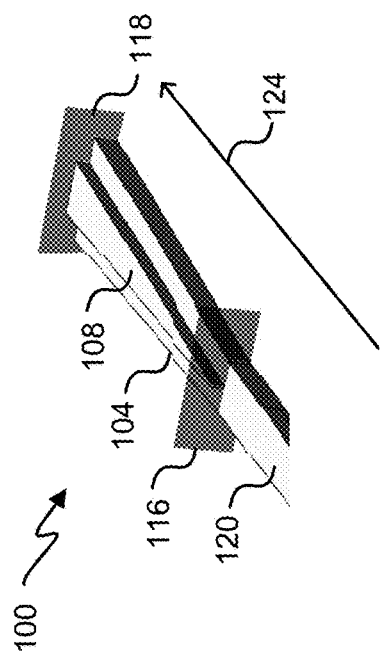
FIG. 1
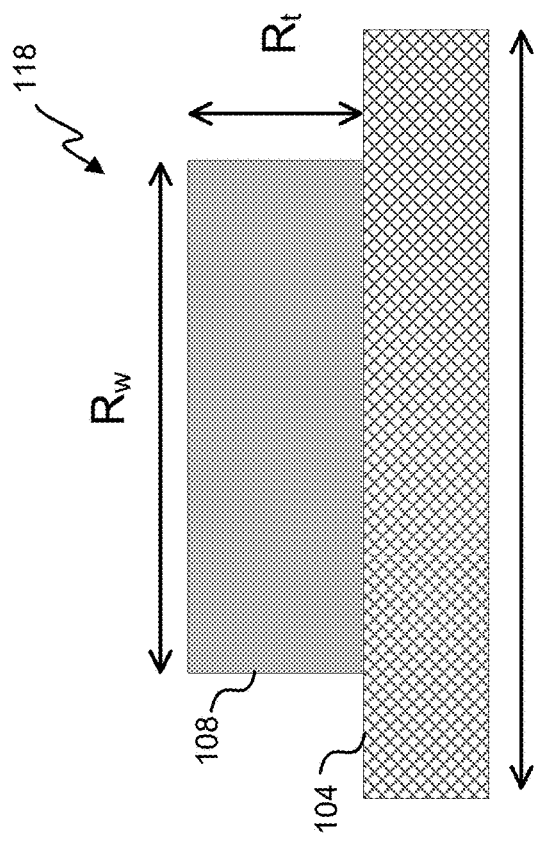
FIG. 3
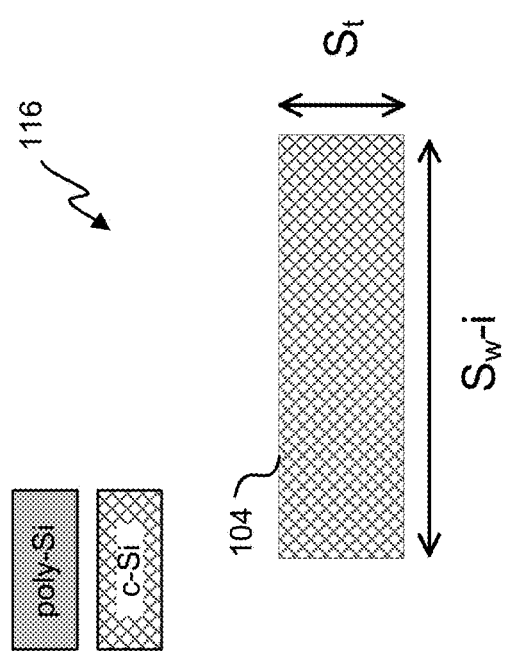
FIG. 2
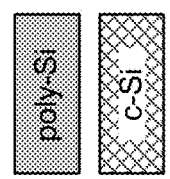

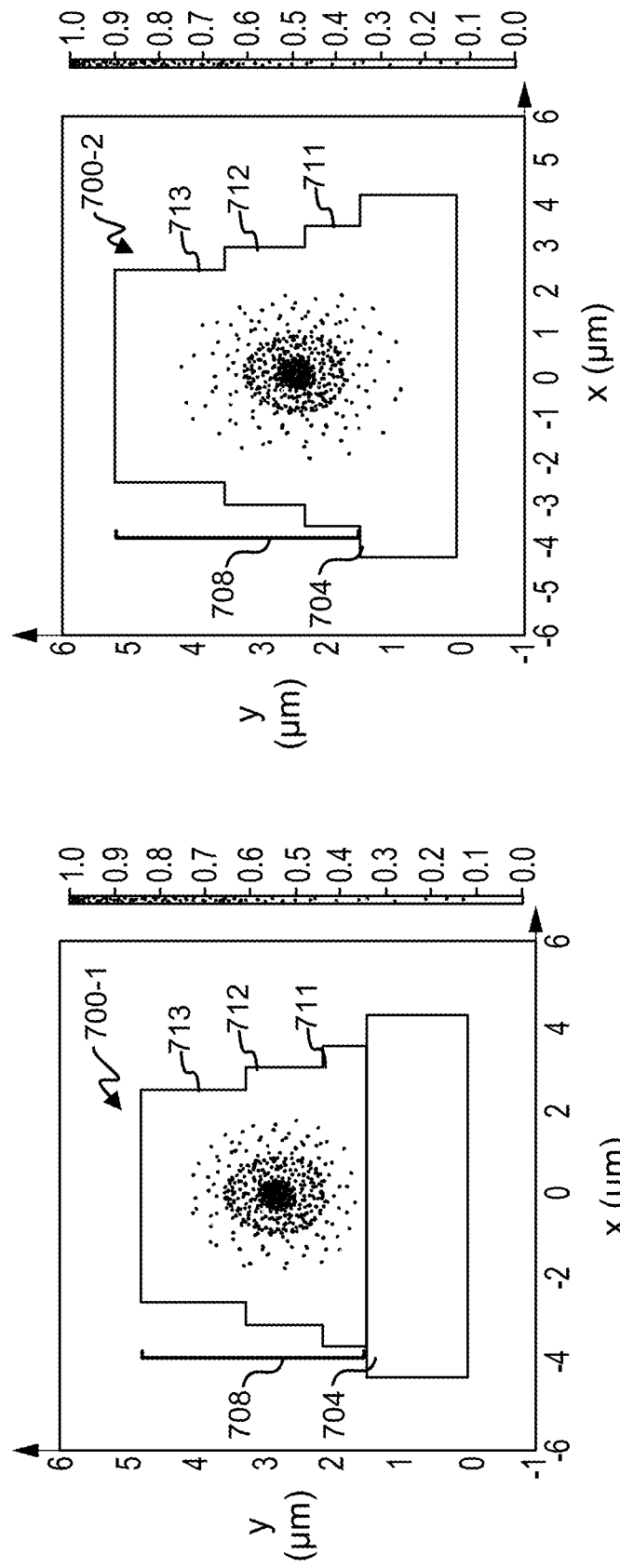

Side

Top

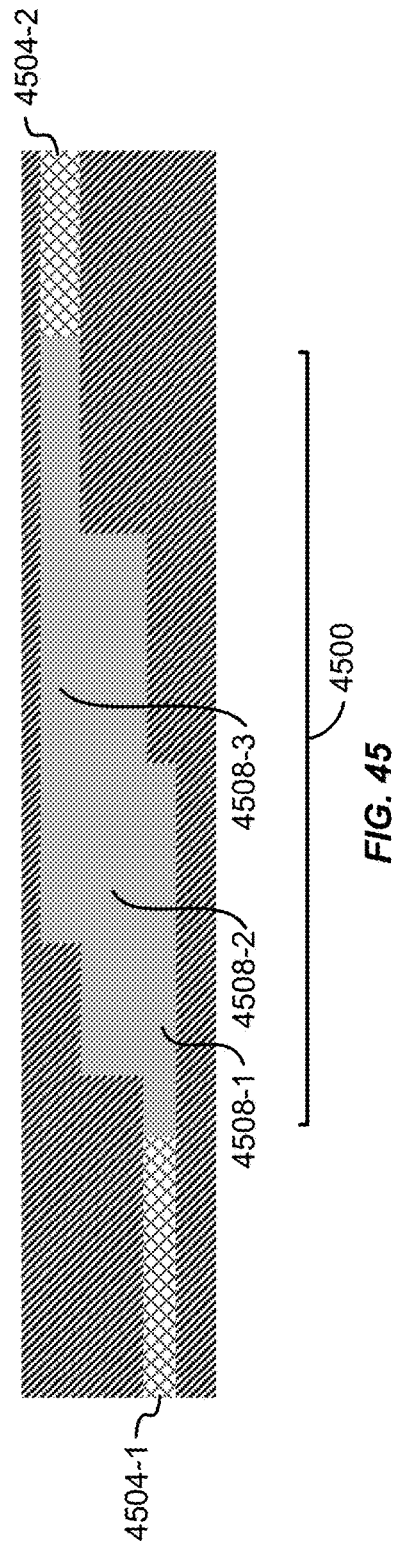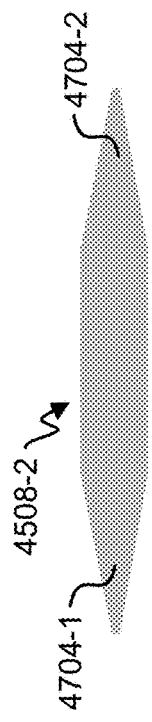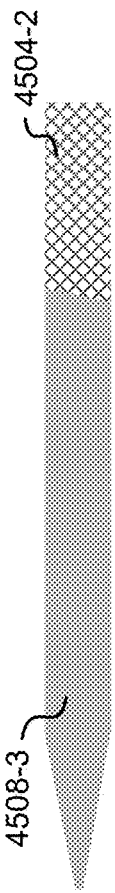
FIG. 45
FIG. 46
FIG. 47
FIG. 48

WAVEGUIDE MODE EXPANDER HAVING NON-CRYSTALLINE SILICON FEATURES

CROSS-REFERENCES TO RELATED APPLICATIONS

This application is a continuation of Ser. No. 16/428,193, filed May 31, 2019, entitled "Waveguide Mode Expander Having Non-Crystalline Silicon Features," which is a continuation of U.S. patent application Ser. No. 15/980,536, filed May 15, 2018, entitled "Method Of Modifying Mode Size Of An Optical Beam, Using A Waveguide Mode Expander Having Non-Crystalline Silicon Features," now U.S. Pat. No. 10,345,521, issued Jul. 9, 2019, which application is a continuation of U.S. patent application Ser. No. 15/487,918, filed Apr. 14, 2017, entitled "Waveguide Mode Expander Having An Amorphous-Silicon Shoulder," now U.S. Pat. No. 10,001,600, issued Dec. 7, 2017, which is a divisional of U.S. patent application Ser. No. 14/722,983, filed May 27, 2015, entitled "Waveguide Mode Expander Having An Amorphous-Silicon Shoulder," now U.S. Pat. No. 9,658,401, issued Dec. 3, 2015, which claims priority to U.S. Provisional Application No. 62/003,404, filed May 27, 2014, entitled "Waveguide Mode Expander Using Polycrystalline Silicon," and U.S. Provisional Application No. 62/044,867, filed Sep. 2, 2014, entitled "Waveguide Mode Expander Having An Amorphous-Silicon Base Layer." The disclosures of all of the aforementioned patent applications are incorporated by reference in their entireties for all purposes. U.S. patent application Ser. No. 15/980,536 is also a divisional of U.S. patent application Ser. No. 14/722,970, filed May 27, 2015, entitled "Waveguide Mode Expander Using Amorphous Silicon," now U.S. Pat. No. 9,885,832, issued Dec. 3, 2015, the disclosure of which is also incorporated by reference in its entirety for all purposes.

BACKGROUND

This application relates to optical waveguides. More specifically, and without limitation, to coupling a silicon waveguide to an optical fiber.

Photonic devices, including optical waveguides, are being integrated on semiconductor chips. Photonic devices integrated on semiconductor chips are often designed for use in fiber-optic communication systems.

BRIEF SUMMARY

This application discloses embodiments of a mode expander for coupling a smaller optical mode, such as a fundamental mode in a semiconductor waveguide, to a larger optical mode, such as a fundamental mode in an optical fiber.

A waveguide mode expander comprises a substrate, a waveguide disposed on the substrate, a shoulder, and a ridge. The waveguide disposed on the substrate comprises crystalline silicon. The shoulder is optically coupled with the waveguide, wherein: the shoulder is disposed on the substrate; and the shoulder comprises non-crystalline silicon. The ridge comprises non-crystalline silicon; the ridge is disposed on the shoulder, such that the shoulder is between the ridge and the substrate; and the ridge has a narrower width than the shoulder, wherein the ridge and the shoulder are configured to guide and expand an optical beam propagating from the waveguide and through the shoulder and the ridge.

In some embodiments, the waveguide has a rectangular cross section. In some embodiments, the ridge comprises a plurality of stages; at a cross section of the waveguide mode expander, each stage of the plurality of stages has a different width; and a first stage of the plurality of stages, which is closer to the shoulder, has a wider width than a second stage of the plurality of stages, which is farther from the shoulder than the first stage. In some embodiments, the first stage is thinner than the second stage. In some embodiments, the non-crystalline silicon is amorphous silicon. In some embodiments, the plurality of stages has a number of stages; and the number of stages is three. In some embodiments, the waveguide mode expander further comprises a cladding (e.g., SiO2) covering the ridge and the shoulder. The ridge expands the optical beam by tapering from a narrower width near an input end to a wider width near an output end. In some embodiments, the substrate comprises buried-oxide layer and a handle layer; the buried-oxide layer is disposed between the shoulder and the handle layer; the buried-oxide layer is disposed between the waveguide and the handle layer; and the buried-oxide layer acts as a cladding layer to the shoulder and the waveguide. In some embodiments, the waveguide mode expander further comprises an interface between the shoulder and the waveguide, wherein the interface forms a plane that is angled with respect to an optical path of the waveguide such that the plane is not orthogonal to an optical path.

In some embodiments, a method for manufacturing a waveguide mode expander is described, the method comprising: providing a substrate having a device layer disposed on the substrate; applying photoresist on the device layer; etching the device layer to form a first recess, the first recess having a shape of a first pattern; removing photoresist from the device layer; filling the first recess with non-crystalline silicon (e.g., amorphous silicon) to form a shoulder; etching the device layer to define a waveguide; etching the shoulder, wherein the shoulder to align with the waveguide; covering the shoulder with cladding; applying photoresist on the cladding; etching the cladding to form a second recess, the second recess having a shape of a second pattern; removing photoresist from the cladding; filling the second recess with non-crystalline silicon, wherein: the non-crystalline silicon forms a ridge of the waveguide mode expander; the shoulder is between the substrate and the ridge; and the ridge has a narrower width than the shoulder.

In some embodiments, etching the cladding uses a highly selective etch such that the cladding is more easily etched than the shoulder. In some embodiments, the second pattern comprises a triangle taper and/or a parabolic taper. Some embodiments further comprise: applying, wherein the cladding is a first cladding, a second cladding on both the first cladding and the non-crystalline silicon; etching the second cladding to form a third recess, the third recess having a shape of a third pattern; filling the third recess with additional non-crystalline silicon to form a second stage of the ridge, wherein filling the second recess formed a first stage of the ridge. In some embodiments, the first stage is wider than the second stage; and the second stage is thicker than the first stage. Some embodiments further comprise: applying, a third cladding the second cladding; etching the third cladding to form a fourth recess, the fourth recess having a shape of a fourth pattern; and filling the fourth recess with additional non-crystalline silicon to form a third stage of the ridge. In some embodiments, amorphous silicon is converted to polycrystalline silicon.

In some embodiments, a waveguide mode expander comprises a substrate, a shoulder, and a ridge. The shoulder is disposed on the substrate, and the shoulder is made of crystalline silicon. The ridge is made of non-crystalline silicon. The ridge is disposed on the shoulder such that the shoulder is between the ridge and the substrate. The ridge has a narrower width than the shoulder, wherein the ridge and the shoulder are configured to guide and expand an optical beam propagating through the shoulder and the ridge.

In some embodiments, the waveguide mode expander further comprises cladding disposed on the waveguide, wherein: the cladding has been etched in a pattern to form a recess; and the ridge is formed by filling the recess with non-crystalline silicon. In some embodiments, the ridge has a plurality of stages, and at a cross section of the waveguide mode expander, each stage of the plurality of stages has a different width, and stages closer to the substrate have wider widths. In some embodiments, a stage closer to the substrate is thinner than a stage farther from the substrate. In some embodiments, the ridge comprises one stage, three stages, and/or five stages. In some embodiments, cladding covers the ridge and/or the shoulder. In some embodiments, the waveguide mode expander is fabricated using a silicon-on-insulator wafer. In some embodiments, the ridge comprises one or more tapers to expand an optical beam.

In some embodiments, a method for manufacturing a waveguide mode expander is described. A substrate having a waveguide disposed on the substrate is provided. Cladding is deposited on the waveguide. Photoresist is applied on the cladding forming a pattern. A recess is etched in the cladding based on the pattern. Photoresist is removed, and the recess is filled with non-crystalline silicon, wherein: the waveguide forms a shoulder of the waveguide mode expander; the non-crystalline silicon forms a ridge of the waveguide mode expander; the shoulder is between the substrate and the ridge; and the ridge has a narrower width than the shoulder.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 1 depicts a perspective drawing of an embodiment of a single-stage mode expander.

FIG. 2 depicts a cross section of an input end of the single-stage mode expander.

FIG. 3 depicts a cross section of an output end of the single-stage mode expander.

FIG. 31 depicts an optical mode confined in a three-stage mode expander having a crystalline silicon shoulder and a non-crystalline silicon ridge.

FIG. 32 depicts an optical mode confined in a three-stage mode expander having a non-crystalline silicon shoulder and a non-crystalline silicon ridge.

FIGS. 45-48 depict an embodiment of a multistage coupler for coupling a first semiconductor waveguide with a second semiconductor waveguide.

Figure 4:
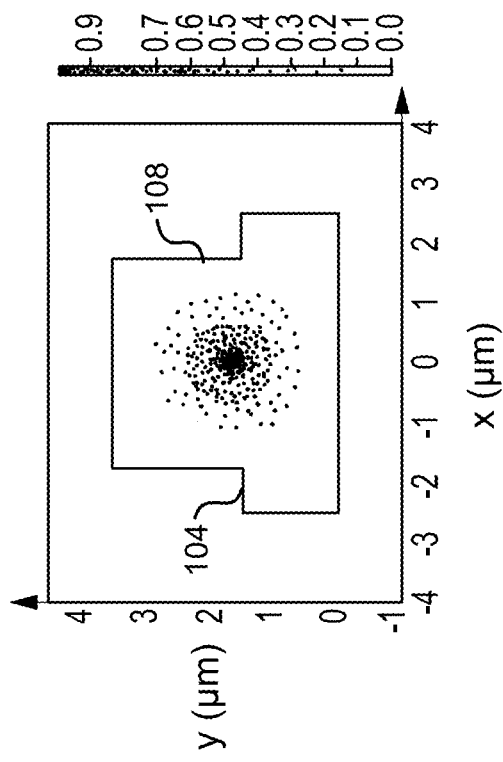
FIGS. 4-6 depict simulations of mode confinement in mode expanders and an optical fiber.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments generally relate to a mode expander for coupling a semiconductor waveguide (e.g., crystalline-silicon waveguide) to an optical fiber.

Referring first to FIG. 1, a perspective drawing of an embodiment of a single-stage mode expander 100 is shown. The single-stage mode expander 100 comprises a shoulder 104 and a ridge 108. The single-stage mode expander 100 has an input end 116 and an output end 118. In some embodiments, the input end 116 is coupled to a waveguide 120 having a rectangular cross section. In some embodiments, the waveguide 120 has a cross section that is not rectangular (e.g., trapezoidal or inverted 'T' shape with a crystalline-silicon ridge on top of a crystalline-silicon shoulder). The output end 118 is coupled with an optical fiber having a round cross section (e.g., an optical fiber having normal or high Numerical Aperture (NA)).

In FIG. 1, both the shoulder 104 and the ridge 108 taper from the output end 118 to the input end 116 so that an optical beam expands that is transmitted from the input end 116 to the output end 118. For example, a beam is transmitted from a waveguide 120 (e.g., a crystalline-silicon waveguide), through the input end 116 of the single-stage mode expander 100, through the output end 118 of the single-stage mode expander 100, and to an optical fiber having a larger core than the waveguide 120. In some embodiments, as the beam propagates through the single-stage mode expander 100, the beam expands adiabatically. A direction of beam propagation 124 is shown as an arrow going from the input end 116 to the output end 118. A person of skill in the art will recognize a beam propagating from the output end 118 to the input end 116 will be compressed.

FIG. 2 depicts a cross section of the single-stage mode expander 100 at the input end 116 of the single-stage mode expander 100. The single-stage mode expander 100 at the input end comprises the shoulder 104, but not the ridge 108. The shoulder 104 has a thickness, St, and a width, $S_w$. The shoulder 104 has an input width, $S_w$-i, at the input end 116. In some embodiments, the input width, $S_w$-i, of the shoulder 104 ranges between 0.2 and 5 μm (e.g., 0.2, 0.5, 1, 2, 3, 4, or 5 μm). The thickness (sometimes referred to as height) of the shoulder 104 ranges between 0.2 and 5 μm (e.g., 0.2, 0.5, 1.0, 1.5, 2, 3, or 5 μm). The shoulder 104 is made of crystalline silicon (c-Si). In some embodiments, the shoulder 104 is simply an extension of the waveguide 120 fabricated on a substrate (e.g., a substrate comprising silicon on insulator and/or SiO2). In some embodiments, the single-stage mode expander 100 further comprises a substrate and/or cladding material.

FIG. 3 depicts a cross section of the single-stage mode expander 100 at the output end 118 of the single-stage mode expander 100. The output end 118 of the single-stage mode expander 100 comprises the shoulder 104 and the ridge 108. The thickness St of the shoulder 104 remains relatively constant from the input end 116 to the output end 118. The width, $S_w$, of the shoulder 104 expands to an output width, $S_w$-o, of the shoulder 104. In some embodiments, the output width $S_w$-o of the shoulder 104 ranges between 2 and 50+μm (e.g., 2, 3, 4, 5, 6, 8, 10, 25, or 50+μm). In some embodiments, the width $S_w$-o of the shoulder 104 at the output end 118 is not critical because a beam is confined laterally (widthwise) by the ridge 108. Thus the width $S_w$-o of the shoulder 104 at the output end 118, in some embodiments, is greater than 4.5 μm. Put another way, in some embodiments mode confinement does not significantly change if the width $S_w$-o of the shoulder 104 at the output end 118 is 5 μm, 20 μm, 500 μm, or 1 meter.

The ridge 108, in FIG. 3, has only one stage. In some embodiments, the ridge 108 comprises more than one stage, so that for a given cross section perpendicular to beam propagation 124, the ridge 108 has varying widths for different stages (e.g., as discussed later in reference to FIGS. 10-18). The ridge 108 in the single-stage mode expander 100 has a thickness, $R_t$, and a width, $R_w$. The thickness $R_t$ of the ridge 108 at the output end 118 is between 0.2 to 10 μm (e.g., 0.2, 0.5, 1, 2, 3, 5, 7, or 10 μm). And in some embodiments, the width of the ridge $R_w$ ranges between 0.2 and 10 μm (e.g., 0.2, 0.5, 1, 2, 2.5, 3, 3.5, 4, 5, 7, or 10 μm). Additionally, in some embodiments, a length of the single-stage mode expander 100, from the input end 116 to the output end 118, is between 25 and 500 μm (e.g., 25, 50, 75, 100, 150, 200, 250, 300, 400, or 500 μm).

The ridge 108, in some embodiments, is made of non-crystalline silicon. In crystalline silicon, a lattice structure is well defined. In non-crystalline silicon, a lattice structure is not well defined. Examples of non-crystalline silicon include amorphous silicon (a-Si) and polycrystalline silicon (poly-Si). In polycrystalline silicon, the lattice structure is not well defined, and a polycrystalline-silicon structure comprises multiple crystal lattices. In some embodiments, though non-crystalline silicon may have more loss than crystalline silicon, non-crystalline silicon is used for manufacturing reasons (e.g., for manufacturing tolerances and/or for expanding a beam larger than a crystalline-silicon layer). Another advantage of non-crystalline silicon, in some embodiments, is that non-crystalline has a stable and predictable index of refraction that is similar to crystalline silicon (e.g., the ridge 108 has a first index of refraction; the shoulder 104 has a second index of refraction; and the first index of refraction minus the second index of refraction is less than 0.05, 0.1, 0.2, or 0.3). In some embodiments, the shoulder 104 is made of non-crystalline silicon.

Figure 5:
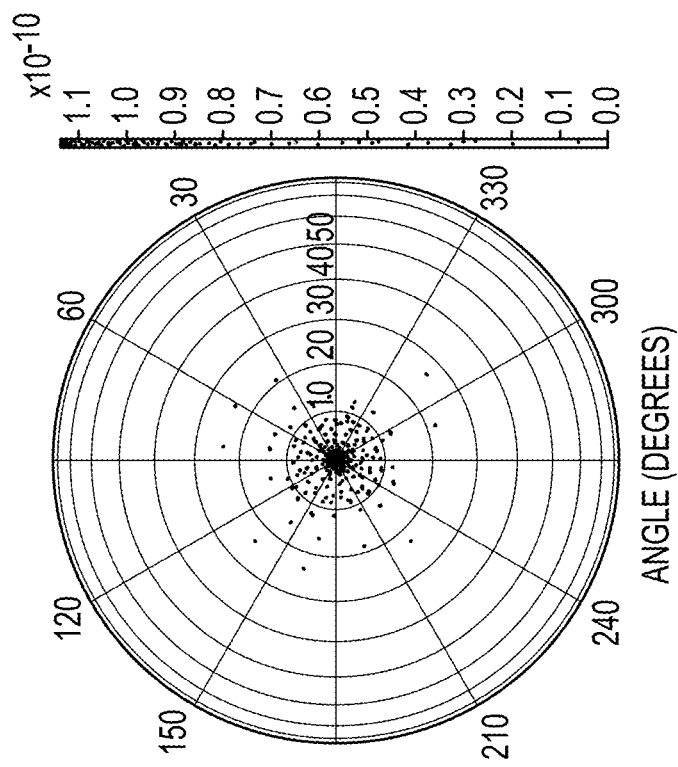
Figure 6:
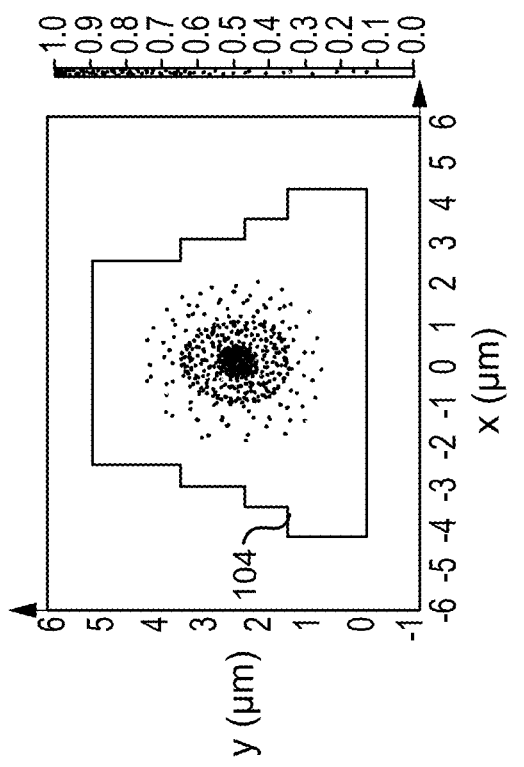

Referring next to FIGS. 4-6, simulations of mode confinements are shown. In FIG. 4, a simulated profile of a beam at the output end 118 of the single-stage mode expander 100 is shown. In some embodiments, a smaller beam divergence angle and/or a larger spot size is preferred. For example, a beam divergence (half angle) of less than 30, 25, 20, 15, or 10 degrees is targeted. In the simulation in FIG. 4, a beam divergence of about 15 degrees was calculated. In FIG. 4, a spot size of 2.6 μm in the vertical direction (y-axis) and about 2.8 μm in the horizontal direction (x-axis) is shown (beam size being measured to $1/e^2$ of peak intensity). In FIG. 5, a simulation of an optical beam confined in a high NA fiber is shown. In FIG. 6, a simulated profile of a beam at an output of a triple-stage mode expander is shown. In some embodiments, having a cross section roughly rectangular is targeted to assist in matching an optical mode of a coupler with an optical mode of an optical fiber.

Figure 7:
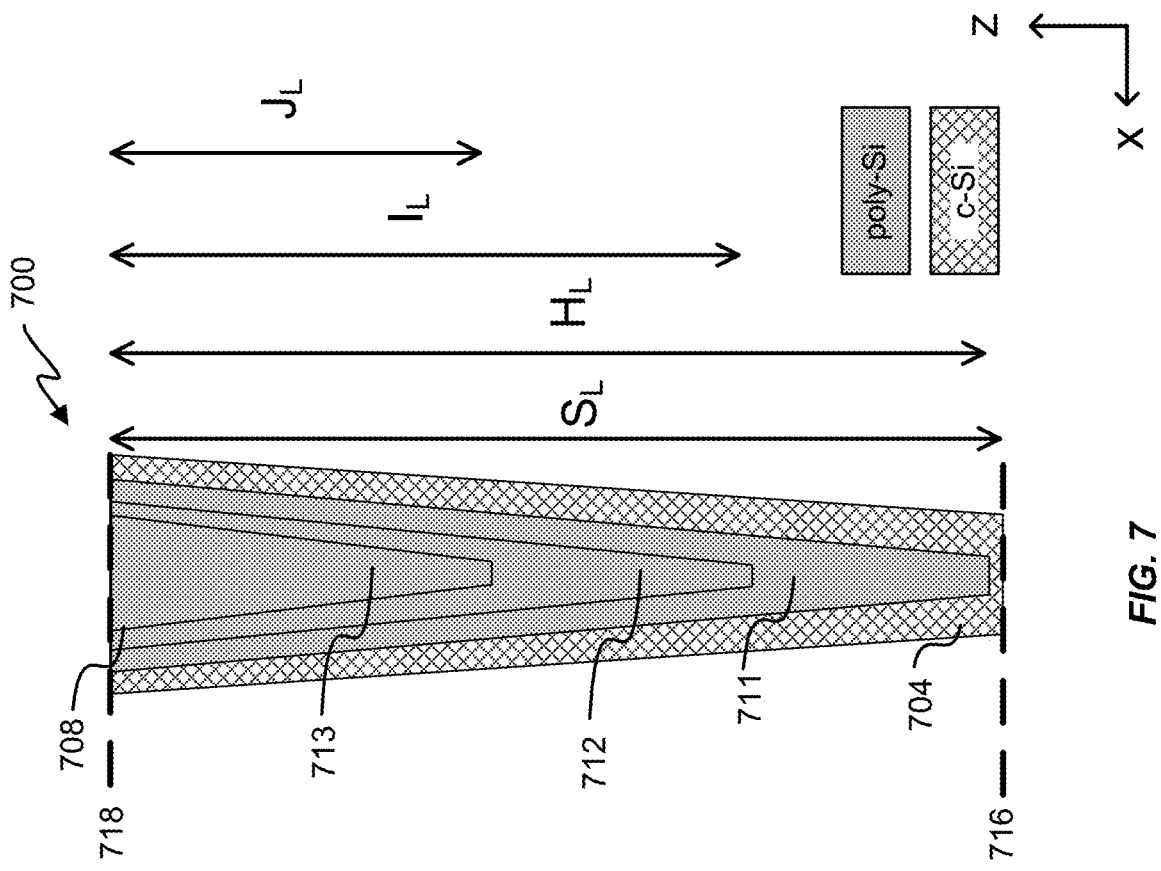
FIG. 7 depicts a top view of an embodiment of a three-stage mode expander.

Referring to FIG. 7, a top view of an embodiment of a three-stage mode expander 700 is shown. The three-stage mode expander 700 comprises a shoulder 704 and a ridge 708. The ridge 708 further comprises a first stage 711, a second stage 712, and a third stage 713. An input end 716 and an output end 718 are also shown. An optical beam is expanded going from the input end 716 to the output end 718. Though FIG. 7 shows the ridge 708 having three stages, other embodiments of mode expanders have fewer or more stages.

The shoulder 704, the first stage 711, the second stage 712, and the third stage 713 taper from the output end 718 to the input end 716. In FIG. 7, the shoulder 704, the first stage 711, the second stage 712, and the third stage 713 have a substantially isosceles-triangle shape tapers (e.g., $z \approx n|x|$). In some embodiments, other taper shapes are used. For example, a taper could be substantially parabolic shaped (e.g., $z \approx x^2$; or $z \approx |x|^n$), or substantially funnel shaped (e.g., $z \approx \pm \ln(|x|)$; or $z \approx \pm \log_n(|x|)$), where n is not constrained to be an integer. Further, tapers for each stage could have a different shape. In FIG. 7, the shoulder 704 has a length, $S_L$, the first stage 711 has a length, $H_L$, the second stage 712 has a length, IL, and the third stage 713 has a length, $J_L$. In some embodiments, $S_L = H_L$.

FIGS. 8-12 show cross sections of the three-stage mode expander 700 going from the input end 716 (e.g., coupling to a semiconductor waveguide) of the three-stage mode expander 700 to the output end 718 (e.g., coupling to an optical fiber). In some embodiments, the first stage 711, the second stage 712, and the third stage 713 are made of non-crystalline silicon. In some embodiments, the shoulder 704 is made of crystalline silicon. In some embodiments, the shoulder 704 is made of non-crystalline silicon. In some embodiments, the shoulder 704 is made of crystalline silicon to reduce a manufacturing step (e.g., to not have to replace some crystalline silicon with non-crystalline silicon). In some embodiments, the shoulder 704 is made of non-crystalline silicon so a mode of an optical beam extends more into the shoulder 704 of the three-stage mode expander 700.

Figure 8:
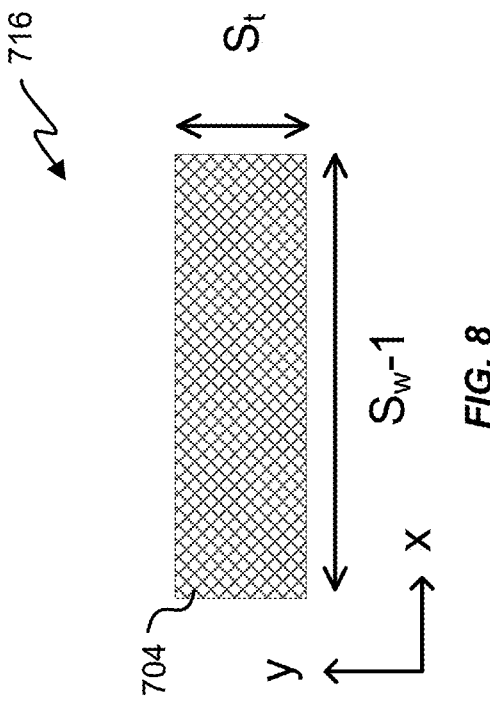
FIGS. 8-12 depict cross sections of the three-stage mode expander.

FIG. 8 depicts a first cross section of the three-stage mode expander 700 at the input end 716. FIG. 8 shows the shoulder 704. The shoulder 704 in the first cross section has a first width, $S_w$-1, and a thickness, St. In some embodiments, the input end 716 is coupled to the waveguide 120. In some embodiments, the first width $S_w$-1 of the shoulder 704, and the thickness St of the shoulder 704, are equal to a width of the waveguide 120 and a thickness of the waveguide 120, respectively. In some embodiments, the shoulder 704 is an extension of the waveguide 120. In some embodiments, the waveguide 120 is in a device layer of a silicon-on-insulator (SOI) wafer. In some embodiments, the three-stage mode expander 700 further comprises a substrate and/or cladding material.

Figure 9:
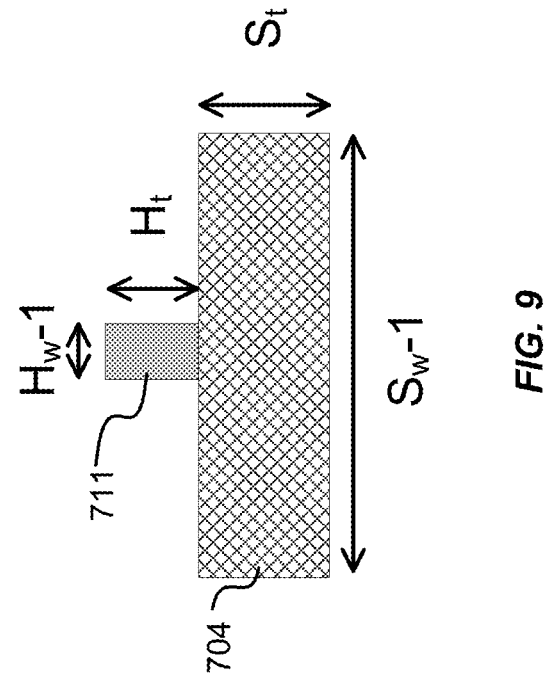

FIG. 9 depicts a second cross section of the three-stage mode expander 700. The second cross section shows a starting of the first stage 711 of the three-stage mode expander 700. The first stage 711 of the three-stage mode expander 700 has a first width, $H_w$-1, and a thickness, $H_t$. The first stage 711 is disposed on top of the shoulder 704.

Figure 10:
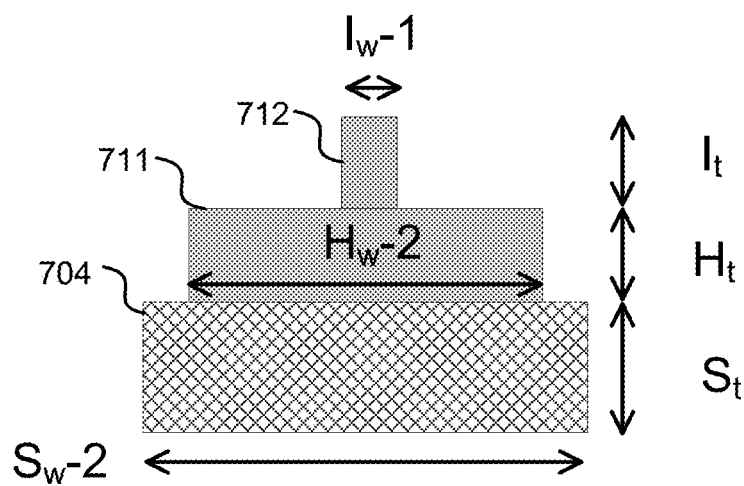

FIG. 10 depicts a third cross section of the three-stage mode expander 700. The third cross section shows a starting of the second stage 712 of the three-stage mode expander 700. The second stage 712 of the three-stage mode expander 700 has a first width, $I_w$-1, and a thickness, $I_t$. The first stage 711 of the three-stage mode expander 700 has a second width $H_w$-2, which is wider than the first width $H_w$-1 of the first stage 711. The shoulder 704 of the three-stage mode expander 700 has a second width $S_w$-2, which is wider than the first width $S_w$-1 of the shoulder 704.

Figure 11:
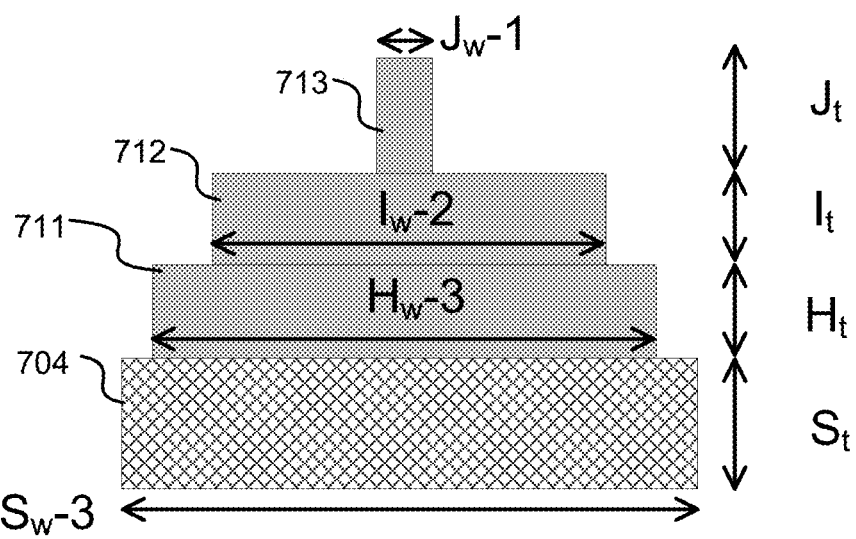

FIG. 11 depicts a fourth cross section of the three-stage mode expander 700. The fourth cross section shows a starting of the third stage 713 of the three-stage mode expander 700. The third stage 713 of the three-stage mode expander 700 has a first width, $J_w$-1, and a thickness, $J_t$. The second stage 712 of the three-stage mode expander 700 has a second width, $I_w$-2, which is wider than the first width $I_w$-1 of the second stage 712. The first stage 711 of the three-stage mode expander 700 has a third width, $H_w$-3, which is wider than the second width $H_w$-2 of the first stage 711. The shoulder 704 of the three-stage mode expander 700 has a third width $S_w$-3, which is wider than the second width $S_w$-2 of the shoulder 704.

Figure 12:
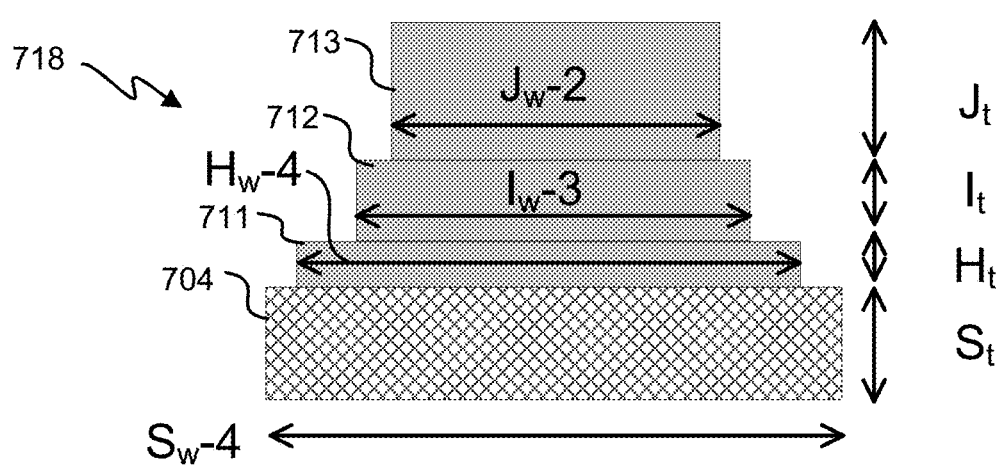

FIG. 12 depicts a fifth cross section of the three-stage mode expander 700. The fifth cross section of the three-stage mode expander 700 is a cross section of the output end 718 of the three-stage mode expander 700. The third stage 713 of the three-stage mode expander 700 has a second width, $J_w$-2, which is wider than the first width $J_w$-1 of the third stage 713. The second stage 712 of the three-stage mode expander 700 has a third width, $I_w$-3, which is wider than the second width $I_w$-2 of the second stage 712. The first stage 711 of the three-stage mode expander 700 has a fourth width $H_w$-4, which is wider than the third width $H_w$-3 of the first stage 711. The shoulder 704 of the three-stage mode expander 700 has a fourth width $S_w$-4, which is wider than the third width $S_w$-3 of the shoulder 704.

A table of dimensions of the shoulder 704 and of the ridge 708 in FIGS. 7-12 is shown below. The ranges and values below are meant to be exemplary for the three-stage mode expander 700 in FIGS. 7-12, and not meant to limit the scope of the invention. In some embodiments, ranges of dimensions below are used to adiabatically expand an optical mode from a silicon waveguide to an optical fiber. In some embodiments, ranges below are used to adiabatically expand an optical mode from a silicon waveguide to an optical fiber in a compact distance to save room on a chip.

| Dimension | Example Ranges (µm) | Example Values (µm) |
|---|---|---|
| $S_L$ | 50-1000; 200-500 | 300, 350, 400 |
| $S_t$ | 0.2-10; 1-4 | 1, 1-5, 2 |
| $S_w$-1 | 0.1-10; 1-4 | 1.5, 2, 2.5, 3 |
| $S_w$-2 | 0.1-10; 2-6 | 3, 4, 5 |
| $S_w$-3 | 0.1-10; 3-10 | 4, 5, 6, 7 |
| $S_w$-4 | 0.1-12; 6-12 | 6.5, 7.5, 8.5 |
| $H_L$ | 50-1000; 200-500 | 300, 350, 400 |
| $H_t$ | 0.2-10; 0.2-1.2 | 0.4, 0.6, 0.8, 1.0 |
| $H_w$-1 | 0.1-10; 0.2-1.2 | 0.4, 0.6, 0.8, 1.0 |
| $H_w$-2 | 0.1-10; 1-4 | 2, 3, 4 |
| $H_w$-3 | 0.1-10; 2-8 | 3, 4, 5 |
| $H_w$-4 | 0.1-11; 4-9 | 6, 6.5, 7, 7.4 |
| $I_L$ | 25-750; 100-400 | 200, 250, 300 |
| $I_t$ | 0.2-10; 0.5-1.4 | 0.8, 1.2, 1.3, 1.4 |
| $I_w$-1 | 0.1-10; 0.4-0.8 | 0.6, 0.7, 0.8 |
| $I_w$-2 | 0.1-10; 1.5-6 | 2, 3, 3.5 |
| $I_w$-3 | 0.1-10; 3-8 | 4, 5, 6, 6.5 |
| $J_L$ | 10-500; 50-250 | 140, 160, 180, 200 |
| $J_t$ | 0.2-10; 1-3 | 1.5, 1.7, 1.9, 2 |
| $J_w$-1 | 0.1-10; 0.6-1.5 | 0.8, 1.0, 1.2, 1.4 |
| $J_w$-2 | 0.1-10; 2-6 | 4.5, 5.0, 5.5 |

Referring to FIGS. 13-18, cross sections of an embodiment of a five-stage mode expander are shown. The five-stage mode expander has a shoulder 1304 and a ridge. The ridge of the five-stage mode expander has a first stage 1311, a second stage 1312, a third stage 1313, a fourth stage 1314, and a fifth stage 1315. FIGS. 13-18 show successive cross sections of the five-stage mode expander going from an input end 1316 of the five-stage mode expander (e.g., coupling to the waveguide 120) toward an output end 1318 of the five-stage mode expander (e.g., coupling to an optical fiber). In some embodiments, the first stage 1311, the second stage 1312, the third stage 1313, the fourth stage 1314, and/or the fifth stage 1315 of the five-stage mode expander are made of non-crystalline silicon.

Figure 13:
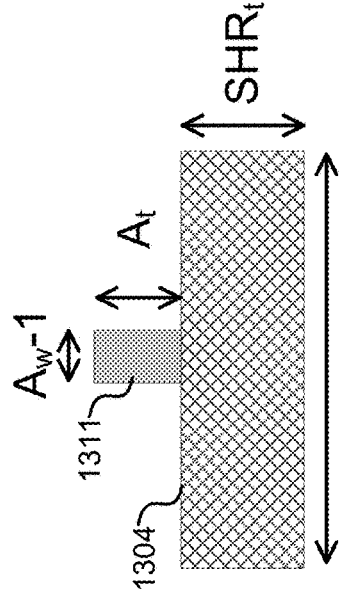

FIG. 13 depicts a first cross section of the five-stage mode expander. The first cross section of the five-stage mode expander shows the shoulder 1304 of the five-stage mode expander. The first cross section of the five-stage mode expander is at the input end 1316. The shoulder 1304 of the five-stage mode expander in the first cross section has a first width, $SHR_w$-1, and a thickness, $SHR_t$. In some embodiments, the input end 1316 is coupled to the waveguide 120. In some embodiments, the first width $SHR_w$-1 of the shoulder 1304, and the thickness $SHR_t$ of the shoulder 1304, are equal to the width of the waveguide 120 and the thickness of the waveguide 120, respectively. In some embodiments, the shoulder 1304 is an extension of the waveguide 120. In some embodiments, the waveguide 120 is in a device layer of a silicon-on-insulator (SOI) wafer. In some embodiments, the five-stage mode expander further comprises a substrate and/or cladding material. In some embodiments, the shoulder 1304 is made of crystalline silicon to reduce a manufacturing step (e.g., to not have to replace some crystalline silicon with non-crystalline silicon). In some embodiments, the shoulder 1304 is made of non-crystalline silicon so a mode of an optical beam extends more into the shoulder 1304 of the five-stage mode expander.

Figure 14:
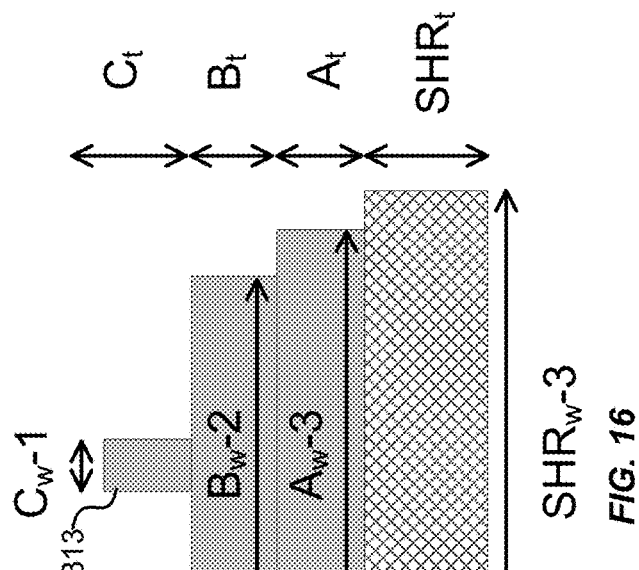
FIGS. 13-18 depict cross sections of an embodiment of a five-stage mode expander.

FIG. 14 depicts a second cross section of the five-stage mode expander. The second cross section shows a starting of the first stage 1311 of the five-stage mode expander. The first stage 1311 of the five-stage mode expander has a first width, $A_w$-1, and a thickness, $A_t$. The first stage 1311 is disposed on top of the shoulder 1304.

Figure 15:
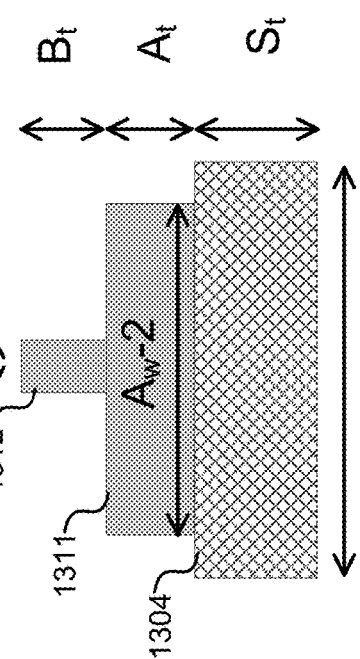

FIG. 15 depicts a third cross section of the five-stage mode expander. The third cross section shows a starting of the second stage 1312 of the five-stage mode expander. The second stage 1312 of the five-stage mode expander has a first width, $B_w$-1, and a thickness, $B_t$. The first stage 1311 of the five-stage mode expander has a second width $A_w$-2, which is wider than the first width $A_w$-1 of the first stage 1311. The shoulder 1304 of the five-stage mode expander has a second width $SHR_w$-2, which is wider than the first width $SHR_w$-1 of the shoulder 1304.

Figure 16:
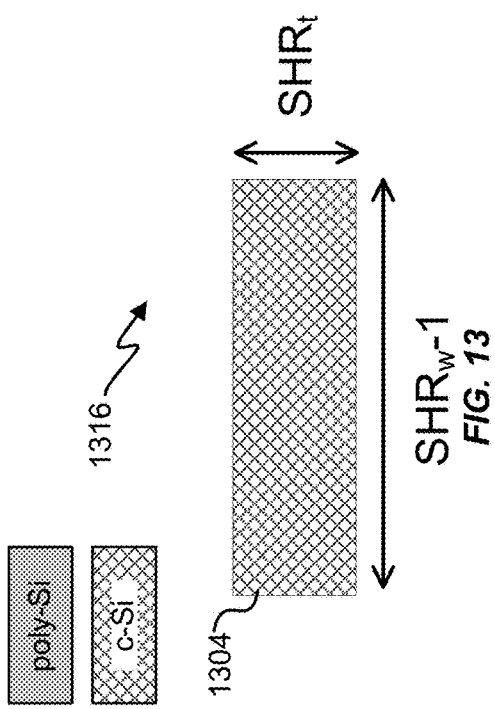

FIG. 16 depicts a fourth cross section of the five-stage mode expander. The fourth cross section shows a starting of the third stage 1313 of the five-stage mode expander. The third stage 1313 of the five-stage mode expander has a first width, $C_w$-1, and a thickness, $C_t$. The second stage 1312 of the five-stage mode expander has a second width, $B_w$-2, which is wider than the first width $B_w$-1 of the second stage 1312. The first stage 1311 of the five-stage mode expander has a third width $A_w$-3, which is wider than the second width $A_w$-2 of the first stage 1311. The shoulder 1304 of the five-stage mode expander has a third width $SHR_w$-3, which is wider than the second width $SHR_w$-2 of the shoulder 1304.

Figure 17:
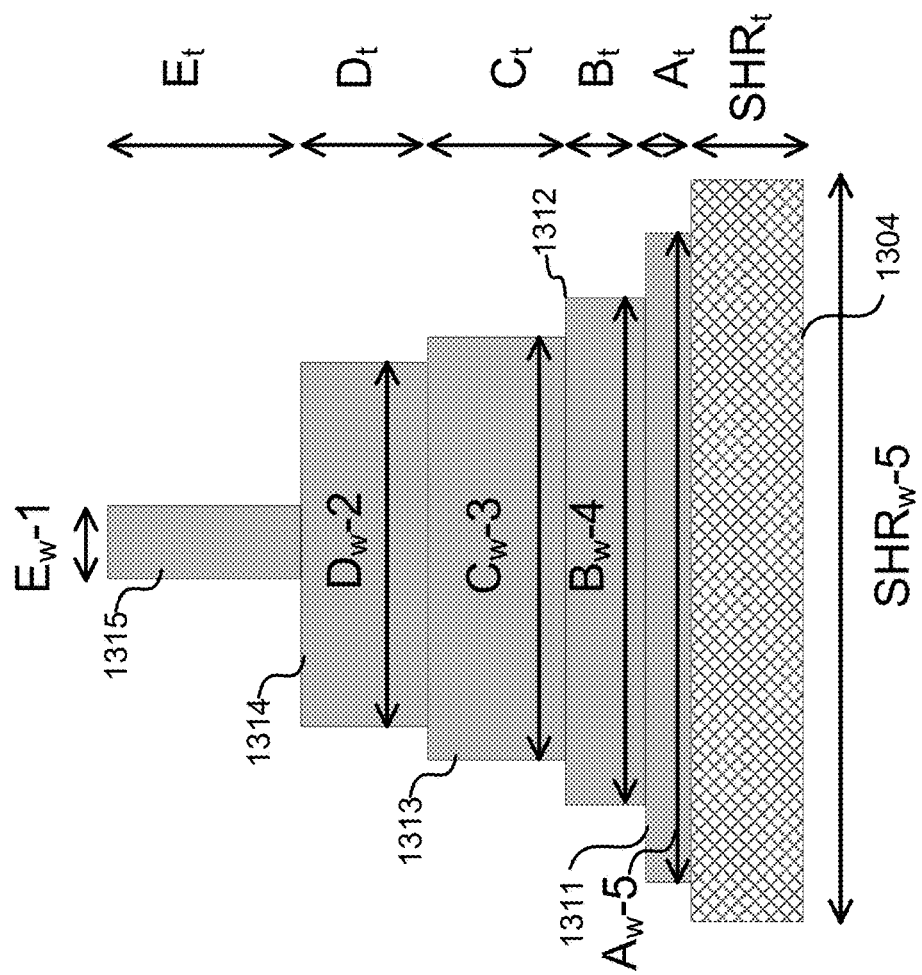

FIG. 17 depicts a fifth cross section of the five-stage mode expander. The fifth cross section shows a starting of the fourth stage 1314 of the five-stage mode expander. The fourth stage 1314 of the five-stage mode expander has a first width, $D_w$-1, and a thickness, $D_t$. The third stage 1313 of the five-stage mode expander has a second width, $C_w$-2, which is wider than the first width $C_w$-1 of the third stage 1313. The second stage 1312 of the five-stage mode expander has a third width, $B_w$-3, which is wider than the second width $B_w$-2 of the second stage 1312. The first stage 1311 of the five-stage mode expander has a fourth width $A_w$-4, which is wider than the third width $A_w$-3 of the first stage 1311. The shoulder 1304 of the five-stage mode expander has a fourth width $SHR_w$-4, which is wider than the third width $SHR_w$-3 of the shoulder 1304.

Figure 18:
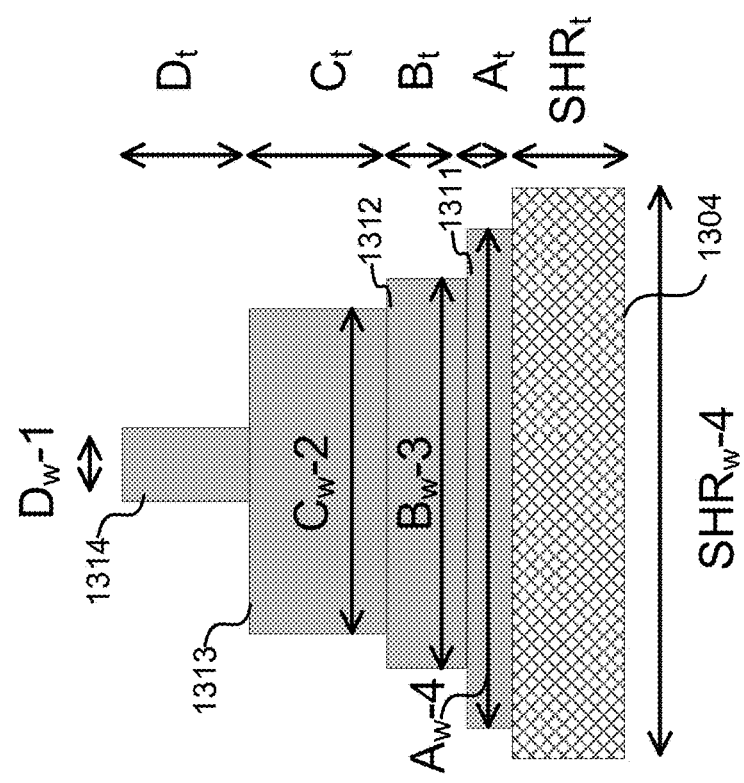

FIG. 18 depicts a sixth cross section of the five-stage mode expander. The sixth cross section shows a starting of the fifth stage 1315 of the mode expander. The fifth stage 1315 of the five-stage mode expander has a first width, $E_w$-1, and a thickness, Et. The fourth stage 1314 of the five-stage mode expander has a second width, $D_w$-2, which is wider than the first width $D_w$-1 of the fourth stage 1314. The third stage 1313 of the five-stage mode expander has a third width, $C_w$-3, which is wider than the second width $C_w$-2 of the third stage 1313. The second stage 1312 of the five-stage mode expander has a fourth width, $B_w$-4, which is wider than the third width $B_w$-3 of the second stage 1312. The first stage 1311 of the five-stage mode expander has a fifth width $A_w$-5, which is wider than the fourth width $A_w$-4 of the first stage 1311. The shoulder 1304 of the five-stage mode expander has a fifth width $SHR_w$-5, which is wider than the fourth width $SHR_w$-4 of the shoulder 1304.

In some embodiments, $S_w$-1<$S_w$-2<$S_w$-3<$S_w$-4<$S_w$-5; $A_w$-1<$A_w$-2<$A_w$-3<$A_w$-4<$A_w$-5; $B_w$-1<$B_w$-2<$B_w$-3<$B_w$-4; $C_w$-1<$C_w$-2<$C_w$-3; and $D_w$-1<$D_w$-2. In some embodiments $A_t$<$B_t$<$C_t$<$D_t$<Et, and/or $A_w$>$B_w$>$C_w$>$D_w$>$E_w$. In some embodiments, thicknesses of stages is constrained: if the thickness of a stage is too great, the mode doesn't adiabatically diverge vertically. If the thickness of the stage is too small it adds potentially unneeded steps to manufacturing. As the mode gets larger, thicker stages are tolerated. That is one reason why some embodiments have $A_t$<$B_t$<$C_t$<$D_t$<Et. Additionally, in some embodiments, a narrow tip width is desired (tip width being a most narrow portion of a stage), and the tip width of a stage is limited by manufacturing capabilities. Similarly, in the three-stage mode expander 700, in some embodiments, $H_t$<$I_t$<$J_t$ and/or $H_w$>$I_w$>$J_w$; and for mode expanders having more or less than three or five stages, widths of upper stages (stages farther from a shoulder) are thicker and/or narrower than lower stages (stages closer to a shoulder).

A table of dimensions of the shoulder 1304 and ridge in FIGS. 13-18 is shown below. The ranges and values below are meant to be exemplary for the five-stage mode expander in FIGS. 13-18, and not meant to limit the scope of the invention. In some embodiments, ranges below are used to adiabatically expand an optical mode from a silicon waveguide to an optical fiber (e.g., UHNA1 fiber from Nufern). In some embodiments, the first stage 1311 and the second stage 1312 have thicknesses are +/−100 nm. In some embodiments, thickness of the third stage 1313, the fourth stage 1314, and the fifth stage 1315 (if present) vary by +/−200 nm. In some embodiments, other tolerances are within 100 nm.

| Dimension | Example Ranges (μm) | Example Values (μm) |
|---|---|---|
| $SHR_t$ | 0.2-10; 1-4 | 1, 1.5, 2 |
| $SHR_w$-1 | 0.1-10; 1-4 | 2, 3, 4 |
| $SHR_w$-2 | 0.1-10; 2-5 | 3.0, 3.5, 3.8 |
| $SHR_w$-3 | 0.1-10; 4-10 | 4, 5, 6 |
| $SHR_w$-4 | 0.1-12; 6-12 | 7, 8, 9 |
| $SHR_w$-5 | 0.1-12; 10-15 | 11, 13, 15 |
| $A_t$ | 0.2-10; 0.2-1.2 | 0.5, 0.6, 0.8, 1.0 |
| $A_w$-1 | 0.1-10; 0.4-1.2 | 0.6, 0.8, 1 |
| $A_w$-2 | 0.1-10; 1-4 | 2.5, 3, 3.5, 4 |
| $A_w$-3 | 0.1-10; 3-9 | 3.5, 4.0, 4.5 |
| $A_w$-4 | 0.1-11; 5-11 | 6, 7, 8 |
| $A_w$-5 | 0.1-12; 6-13 | 10, 11, 13 |
| $B_t$ | 0.2-10; 0.5-1.4 | 0.8, 1.2, 1.3, 1.4 |
| $B_w$-1 | 0.1-10; 0.4-0.8 | 0.5, 0.6, 0.7 |
| $B_w$-2 | 0.1-10; 2-6 | 3.0, 3.5, 4 |
| $B_w$-3 | 0.1-10; 2-8 | 5, 6, 7 |
| $B_w$-4 | 0.1-10; 6-13 | 9, 11, 12 |
| $C_t$ | 0.2-10; 1-4 | 1, 2, 3 |
| $C_w$-1 | 0.1-10; 0.6-1.5 | 0.8, 1.0, 1.2, 1.4 |
| $C_w$-2 | 0.1-10; 4-6 | 4.5, 5, 5.5 |
| $C_w$-3 | 0.1-12; 8-12 | 8, 10, 11 |
| $D_t$ | 0.2-10; 1-5 | 2, 3, 4 |
| $D_w$-1 | 0.1-10; 1-2 | 1, 1.5, 2 |
| $D_w$-2 | 0.1-11; 5-11 | 6, 7, 8.5 |
| $E_t$ | 0.2-10; 2-7 | 4, 5, 6 |
| $E_w$-1 | 0.1-10; 1.5-3 | 1.5, 2, 2.5, 3 |

Figure 19:
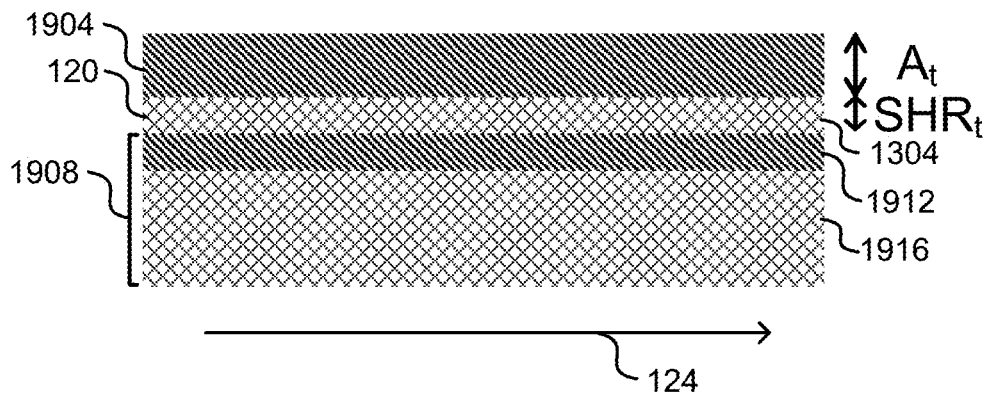
FIGS. 19-28 depict simplified sketches of the five-stage mode expander during fabrication.

Referring next to FIGS. 19-28, simplified sketches of the five-stage mode expander during fabrication of the five-stage mode expander are shown. Similar techniques are used to manufacture the single-stage mode expander 100, the three-stage mode expander 700, and mode expanders having different number of stages. In FIG. 19, a waveguide 120 made of crystalline silicon is sandwiched between a substrate 1908 and a first cladding layer 1904. The substrate 1908 comprises a buried-oxide (BOX) layer 1912 and a handle layer 1916. The waveguide 120 is made by processing a device layer of a silicon-on-insulator (SOI) wafer, wherein the BOX layer 1912 and the handle layer 1916 are part of the SOI wafer. The BOX layer 1912 is made of SiO2, and the handle layer is made of crystalline silicon. In some embodiments, the BOX layer 1912 acts as a lower cladding layer to the waveguide 120 and/or shoulder 1304. The direction of beam propagation 124, from left to right, is also shown. As mentioned previously, the direction of beam propagation 124 is defined to facilitate explanation. A person of skill in the art will recognize that mode expanders, such as the five-stage mode expander, can be used in a reverse direction of the beam propagation 124 (e.g., to couple light from an optical fiber to a silicon waveguide).

In some embodiments, the first cladding layer 1904 is made of SiO2. The first cladding layer 1904 is polished (e.g., using chemical-mechanical planarization (CMP)) to a thickness equal to the thickness $A_t$ of the first stage 1311 of the five-stage mode expander. The shoulder 1304 of the five-stage mode expander is also shown, contiguous with the waveguide 120. In some embodiments, shoulder 1304 is formed while forming the waveguide 120.

Figure 20:
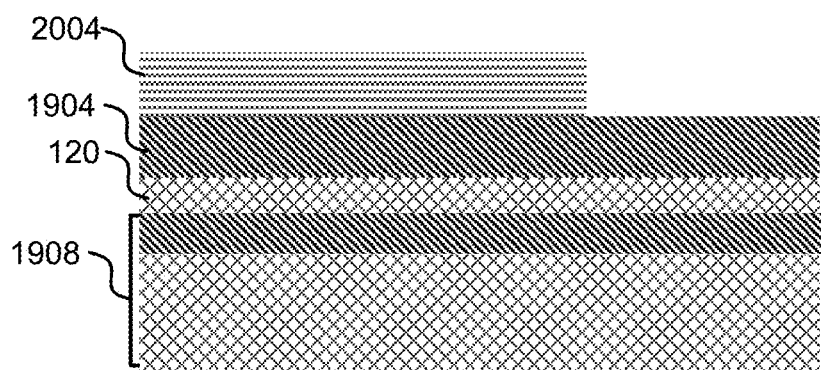

In FIG. 20, a first photoresist 2004 is placed in a first pattern on top of the first cladding layer 1904. The first pattern covers part of the first cladding layer 1904, but leaves part of the first cladding layer 1904 exposed. The first pattern is used to form the first stage 1311, so the first pattern will be similar to a top view of the first stage 1311. As mentioned previously, stages can have a linear taper (e.g., similar to an isosceles triangle), a funnel-shape taper, and/or an exponential-shaped taper. In some embodiments, photolithography methods are used in placing photoresist layers (e.g., preparing the cladding layer; applying the photoresist; aligning a mask; exposing photoresist to UV light; and removing photoresist exposed to the UV light).

Figure 21:
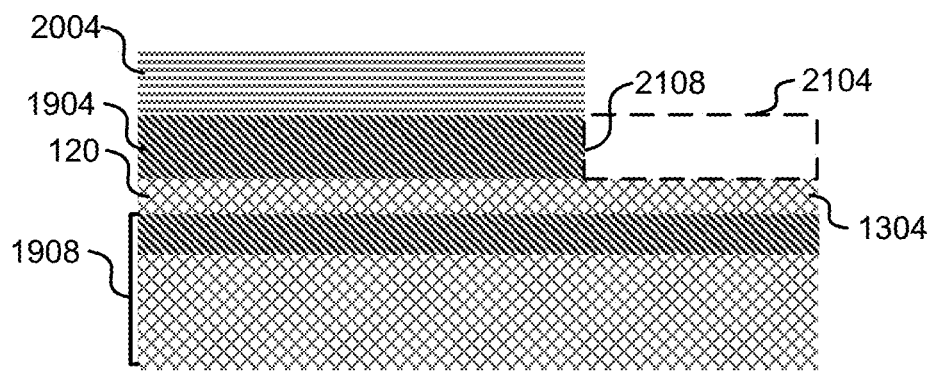
Figure 22:
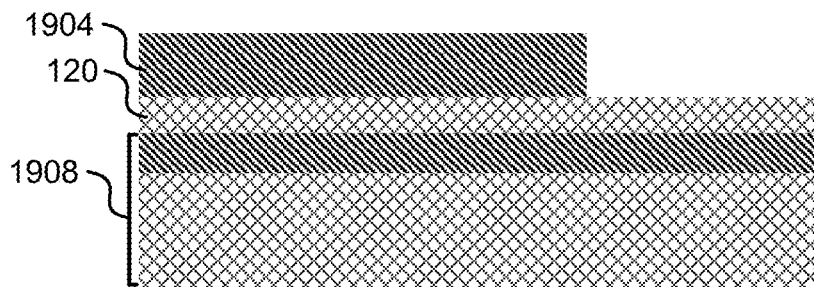

In FIG. 21, a portion of the first cladding layer 1904 has been etched to form a first recess 2104 in the first cladding layer 1904. Walls 2108 of the first cladding layer 1904 form walls of the first recess 2104. A top surface of the shoulder 1304 forms a bottom surface of the first recess 2104. The first recess 2104 has an outline in the shape of the first pattern. In some embodiments, a highly selective etch is used so that etching through SiO2 of the first cladding layer 1904 happens more quickly than etching the shoulder 1304. In FIG. 22, the first photoresist 2004 is removed.

Figure 23:
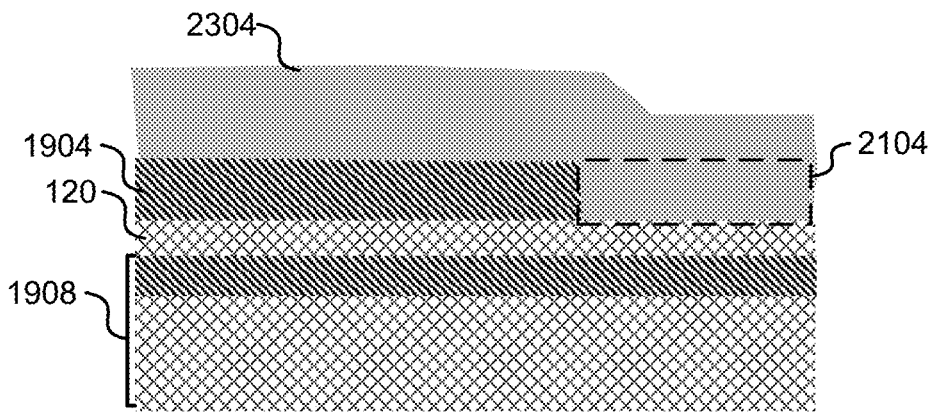

In FIG. 23, the first recess 2104 is filled with non-crystalline silicon 2304, e.g., a-Si. In some embodiments, the first cladding layer 1904 is also, partially or fully, covered with non-crystalline silicon 2304 to ensure the first recess 2104 is completely filled.

Figure 24:
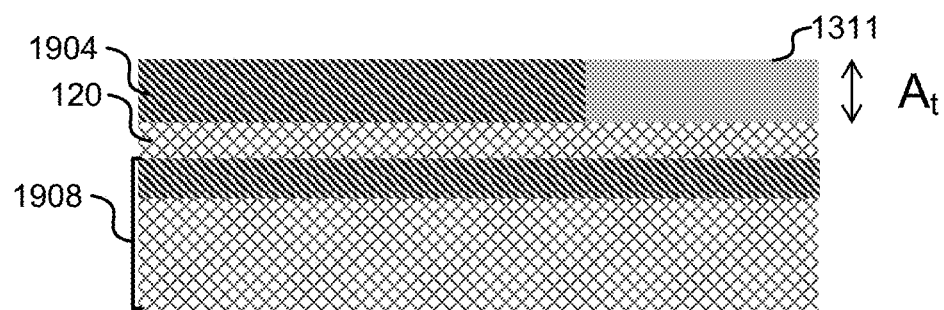

In FIG. 24, a-Si is converted into poly-Si (e.g., by heating), and excess poly-Si is removed (e.g., using CMP) so that the poly-Si has a thickness equal to the first cladding layer 1904. In some embodiments, a highly selective CMP process is used that polishes the poly-Si more aggressively than SiO2 of the first cladding layer 1904. Polishing the poly-Si finishes the first stage 1311 of the five-stage mode expander.

Successive stages are created by applying a cladding layer, opening a recess in the cladding layer, filling the opened recess in the cladding layer with non-crystalline-silicon, and polishing the non-crystalline-silicon to a height of the cladding layer. Thus a mode expander can be created that has a finial height greater than a height of a device layer of an SOI wafer. In some embodiments, the number of stages made is a tradeoff between performance and manufacturability. Thus widths of stages are controlled by photolithography, and thickness controlled by deposition, high-selectivity etching, and CMP. Thus, in some embodiments, this process provides a way to manufacture a mode expander precisely with favorable manufacturing tolerances (e.g., as compared to simply etching a mode expander from crystalline silicon).

Figure 25:
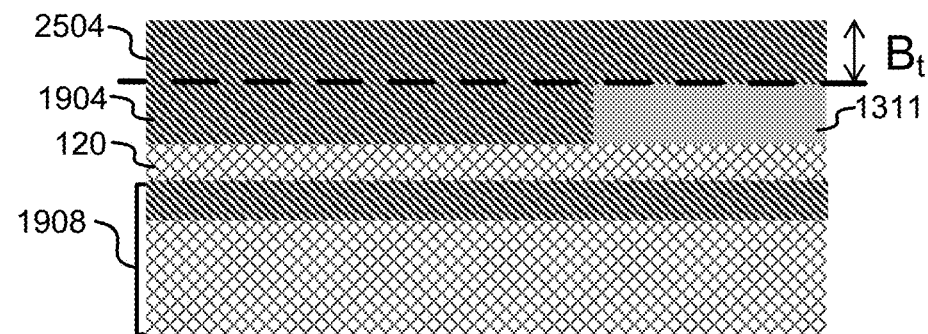

To further illustrate successive stages being formed, FIGS. 25-29, provide illustrations of forming the second stage 1312 of the five-stage mode expander. In FIG. 25, a second cladding layer 2504 is deposited on top of the first cladding layer 1904 and on top of the first stage 1311 of the five-stage mode expander. The second cladding layer 2504 is polished to the thickness $B_t$ of the second stage 1312 of the five-stage mode expander. FIG. 25 represents a start in making the second stage 1312 of the five-stage mode expander.

Figure 26:
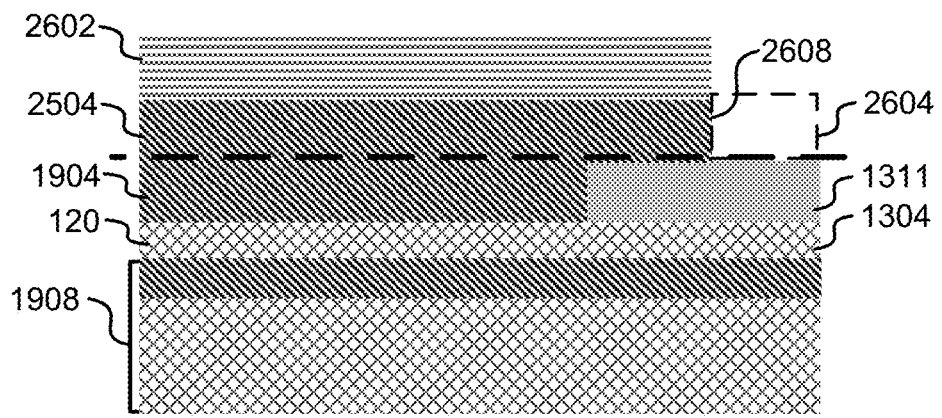

In FIG. 26, a second photoresist 2602 is placed in a second pattern on top of the second cladding layer 2504. The second pattern covers part of the second cladding layer 2504, but leaves part of the second cladding layer 2504 exposed. The second pattern is used to form the second stage 1312 of the five-stage mode expander, so the second pattern will be similar to a top view as the second stage 1312.

A portion of the second cladding layer 2504 has been etched to form a second recess 2604 in the second cladding layer 2504. Walls 2608 of the second cladding layer 2504 form walls of the second recess 2604. A top surface of the first stage 1311 forms a bottom surface of the second recess 2604. The second recess 2604 has an outline in the shape of the second pattern.

Figure 27:
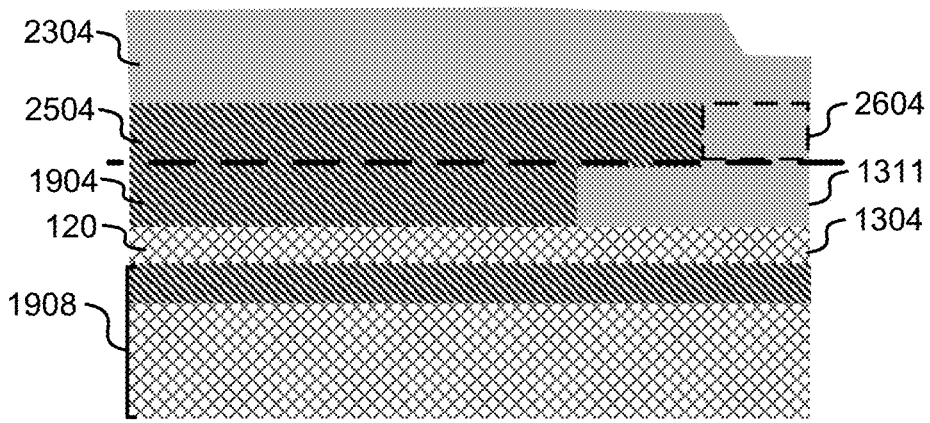

In FIG. 27, the second photoresist 2602 is removed and the second recess 2604 is filled with non-crystalline silicon 2304, e.g., a-Si. In some embodiments, the second cladding layer 2504 is also covered with non-crystalline silicon 2304 to ensure the second recess 2604 is completely filled.

Figure 28:
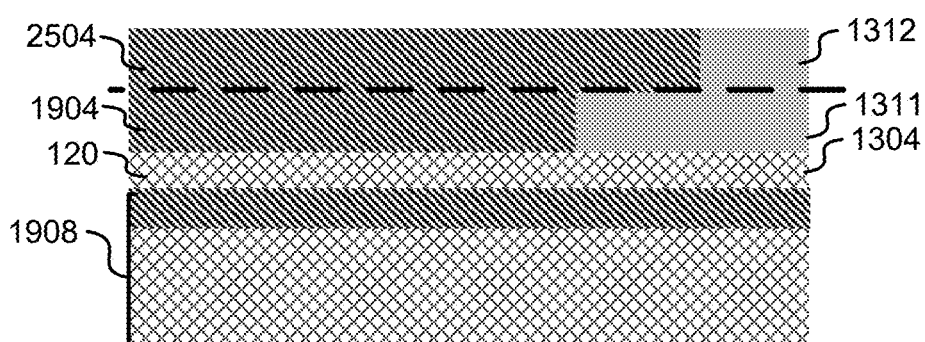

In FIG. 28, a-Si is converted into poly-Si, and excess poly-Si is removed so that the poly-Si has a thickness equal to the first cladding layer 1904. In some embodiments, a highly selective CMP process is used that polishes the poly-Si more aggressively than SiO2 of the second cladding layer 2504. Polishing the poly-Si finishes the second stage 1312 of the five-stage mode expander. Similar steps are performed to form all five stages of the five-stage mode expander.

Figure 29:
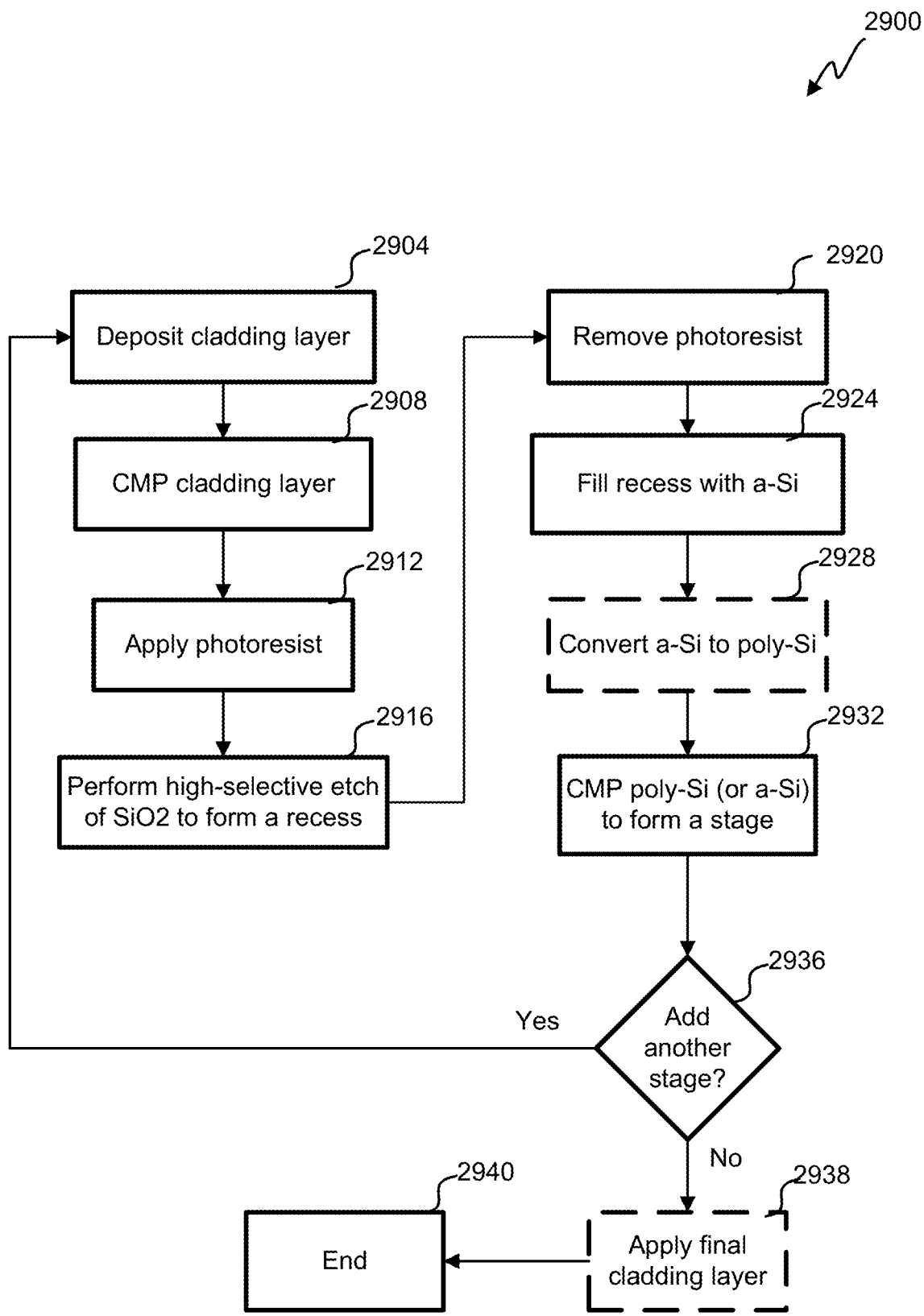
FIG. 29 depicts an embodiment of a flowchart of a process for manufacturing a mode expander.

Referring to FIG. 29, a flowchart of an embodiment of a process 2900 for manufacturing a mode expander is shown. In step 2904 a cladding layer is deposited (e.g., SiO2 as cladding for a waveguide). The cladding layer is polished to a predetermined height (e.g., using CMP), step 2908. In some embodiments, the predetermined height is a height of a stage of the mode expander. Polishing the cladding layer creates a flat surface. In step 2912, photoresist is placed on the flat surface. In some embodiments, before photoresist is placed on the flat surface, a thin layer of silicon nitride ($Si_3N_4$) is placed on the flat surface (e.g., the thin layer of silicon nitride being 50, 75, 100, 125, 150, or 200 nm thick). The thin layer of silicon nitride is used as a stop layer for CMP polishing instead of SiO2, as discussed in step 2932. In step 2916, a recess is etched in the cladding layer.

In step 2920, photoresist is removed. In step 2924, the recess is filled with a-Si. In some embodiments, the recess and the cladding layer are blanketed with a-Si. In some embodiments, only a portion of the cladding layer is blanketed with a-Si when filling in the recess. In step 2928, the a-Si is optionally converted to poly-Si (e.g., by heat). In some embodiments, the a-Si is not converted into polysilicon. For example, at 1330 and 1550 nm wavelengths, light has less attenuation in a-Si than polysilicon. Thus lower-temperature processes (e.g., lower than 400, 500, and/or 600 degrees C.) are used so that not as much a-Si converts into polysilicon. In step 2932, a highly selective CMP polish is used to remove extra poly-Si so that the polysilicon does not exceed the predetermined height (e.g., using the cladding layer or $Si_3N_4$ as a stop layer for the highly-selective CMP polish).

In step 2936, a decision is made whether or not to add another stage. If the answer is yes, then the process returns to step 2904. If the answer is no, then the process proceeds to step 2938. In Step 2938, an optional final cladding layer is applied. In some embodiments, a final cladding layer is applied to better confine a mode in the mode expander. In some embodiments, the final cladding layer covers the shoulder and/or the ridge. In step 2940, the process ends.

Figure 30:
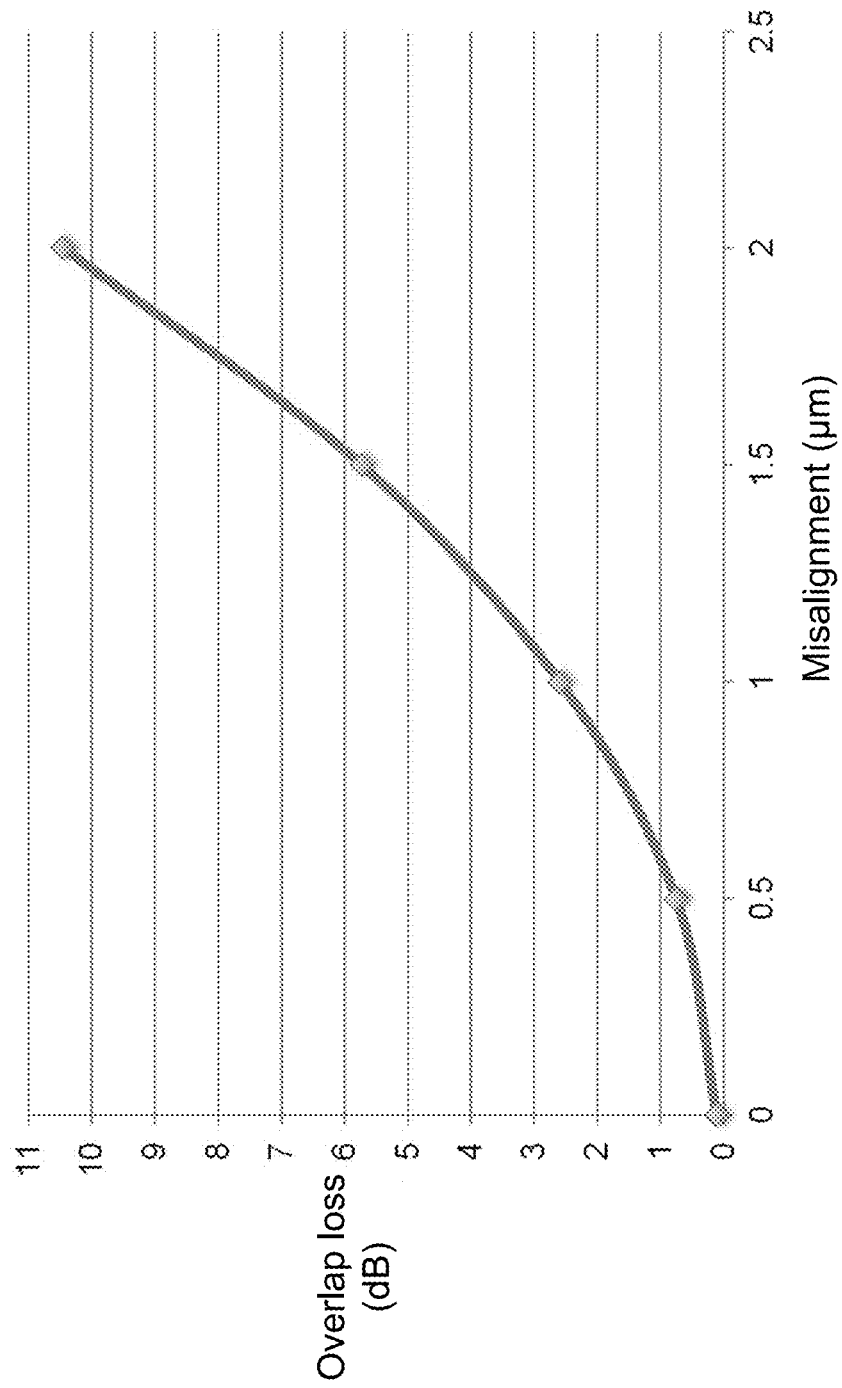
FIG. 30 depicts a graph showing simulated loss due to misalignment between a single-stage mode expander and an optical fiber.

In some embodiments, a mode expander is designed to reduce coupling loss when end coupling a beam into an optical fiber (e.g., butt coupling). In FIG. 30, a graph shows simulated loss due to misalignment between single-stage mode expander 100 (e.g., FIGS. 1 and 4) and the optical fiber in FIG. 5. An x-axis shows misalignment measured in microns (misalignment measures an offset of the center of the single-stage mode expander 100 to a center of the optical fiber in FIG. 5). A y-axis shows loss measured in decibels. The graph in FIG. 30 shows a loss less than 1 dB for a 0.5 µm misalignment; a loss between 2 and 3 dB for a 1 µm misalignment; a loss between 5 and 6 dB for a 1.5 µm misalignment; and a loss between 10 and 11 dB for a 2.0 µm misalignment.

FIG. 31 depicts an optical mode in a first three-stage mode expander 700-1. The first three-stage mode expander 700-1 comprises the shoulder 704 and the ridge 708 (which includes the first stage 711, the second stage 712, and the third stage 713). The shoulder 704 of the first three-stage mode expander 700-1 is made of crystalline silicon. The ridge 708 is made of non-crystalline silicon.

FIG. 32 depicts an optical mode in a second three-stage mode expander 700-2. The second three-stage mode expander 700-2 comprises the shoulder 704 and the ridge 708 (which includes the first stage 711, the second stage 712, and the third stage 713). The shoulder 704 of the second three-stage mode expander 700-2 is made of non-crystalline silicon. The ridge 708 of the second three-stage mode expander 700-2 is made of non-crystalline silicon.

Non-crystalline silicon can have a refractive index higher, perhaps slightly, than crystalline silicon. The difference between an index of refraction of non-crystalline silicon and crystalline silicon, in some embodiments, is caused during processing of a mode expander (e.g., heating a-Si and/or chemicals used). A difference of index of refraction can vary from fabrication unit to fabrication unit (e.g., using different temperatures and/or chemicals). Having differences in the indices of refraction between the shoulder 704 and the ridge 708 results in an optical mode being more tightly confined to the ridge 708, as seen in comparing the optical mode in the first three-stage mode expander 700-1 in FIG. 31 to the optical mode in the second three stage mode expander 700-2 in FIG. 32. Put another way, due to the higher refractive index of a-Si, a-Si placed on top of crystalline Si produces a confined mode in the a-Si and results in a smaller optical mode than would result if the shoulder 704 and the ridge 708 had identical indices of refraction. In some embodiments, a smaller optical mode limits coupling efficiency. Thus, in some embodiments, some or all of a crystalline-silicon shoulder and/or waveguide 120 is replaced with non-crystalline silicon before forming a ridge (e.g., to preserve a larger mode). Therefore, in some embodiments, a mode expander has a shoulder and a ridge of the same material.

Figure 33:
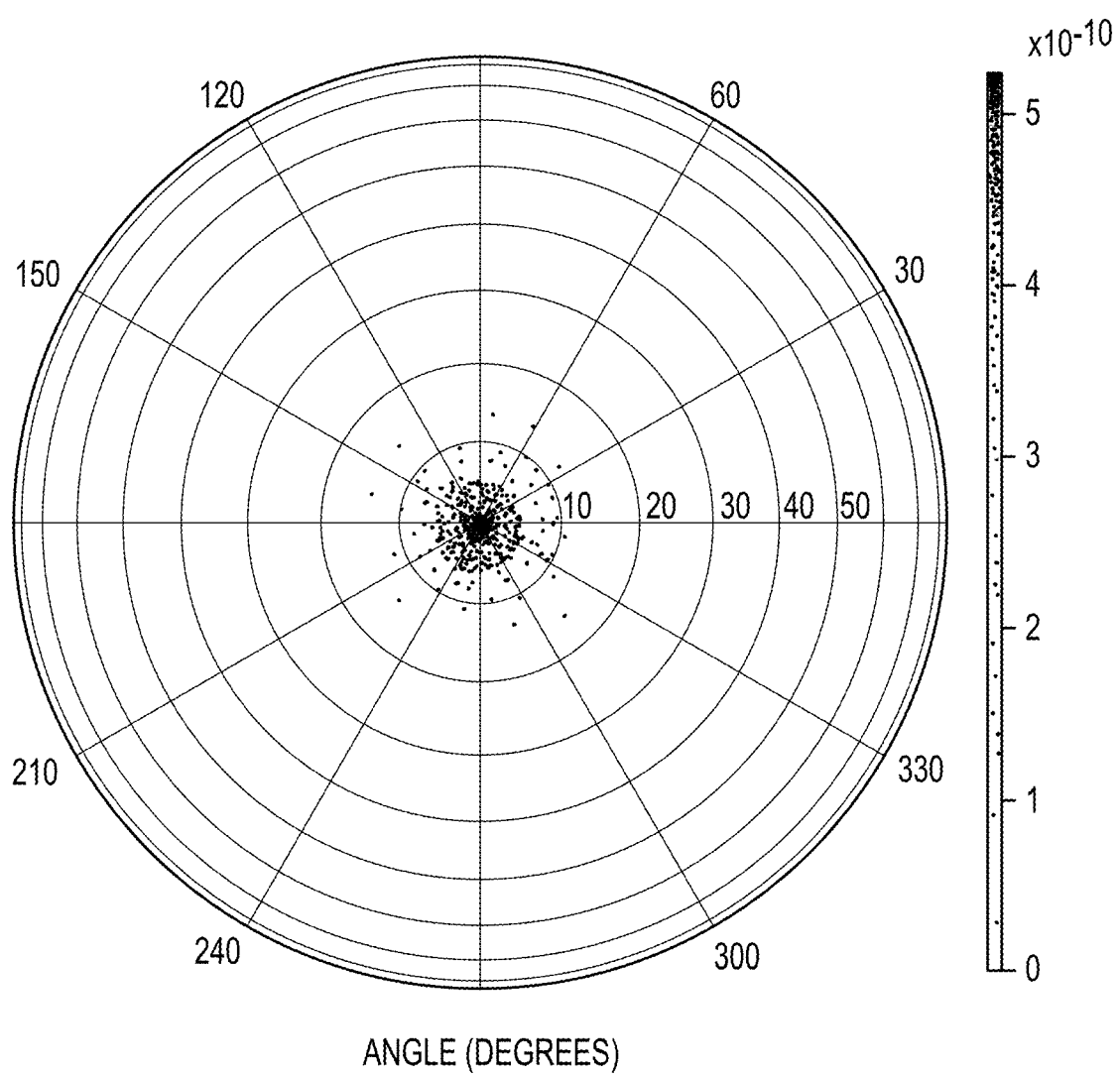
FIG. 33 is a plot of simulated mode divergence of a three-stage mode expander.

Referring to FIG. 33, a plot of calculated mode divergence of the three-stage mode expander 700 at the output end 718 is shown. The calculated mode divergence is about 14 degrees horizontal, full-width, half-max (FWHM); and about 16 degrees Vertical FWHM. A beam having a wavelength of 1310 nm has a beam width (horizontal) of about 4.6 µm and a beam height (vertical) of about 4.0 µm. A beam having a wavelength of 1550 nm has a beam width (horizontal) of about 4.6 µm and a beam height (vertical) of about 4.0 µm.

Losses coupling to an optical fiber are estimated to be less than 1.8 dB (Taper<0.1 dB, Misalignment (0.5 µm)<0.5 dB, splicing <0.2 dB, a-Si (20 dB/cm)<0.6 dB, epoxy gap (5 µm)<0.4 dB).

Figure 34:
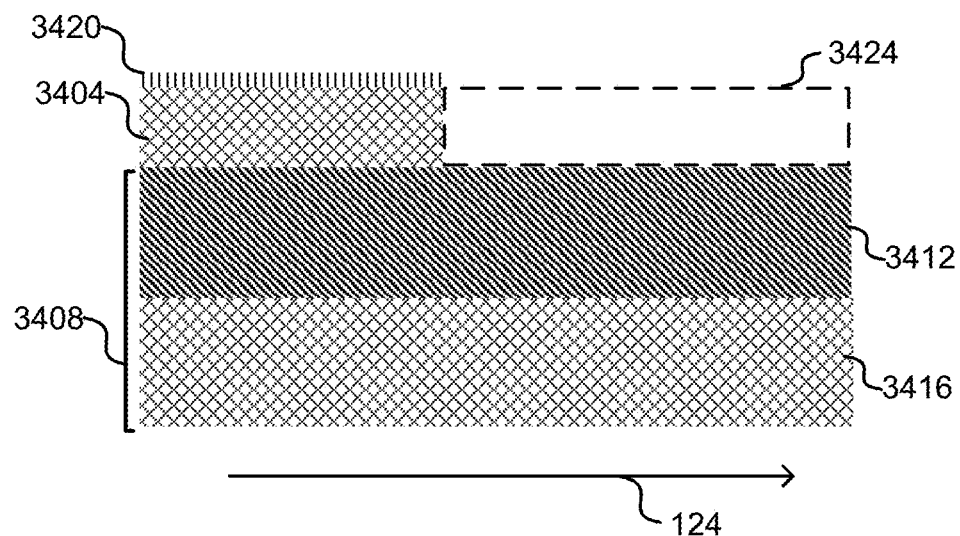
FIGS. 34-39 depict views of an embodiment of forming a non-crystalline silicon shoulder of a mode expander.

Referring to FIG. 34, a side view of an embodiment of a device layer 3404 disposed on a substrate 3408 is shown. The substrate 3408 comprises a BOX layer 3412 and a handle layer 3416. The device layer 3404 and the handle layer 3416 are made of crystalline silicon. The device layer 3404, BOX layer 3412, and the handle layer 3416 are part of an SOI wafer. In some embodiments, the device layer has a thickness (vertical) of 1.5 µm. A CMP stop 3420 is disposed on the device layer 3404. An example of a CMP stop 3420 is silicon nitride. The direction of beam propagation 124, from left to right is also shown.

Part of the device layer 3404 has been removed (e.g., etched) to form a recess 3424 in the device layer 3404. The part of the device layer 3404 removed to form the recess 3424 has been performed to make a non-crystalline shoulder for a mode expander.

Figure 35:
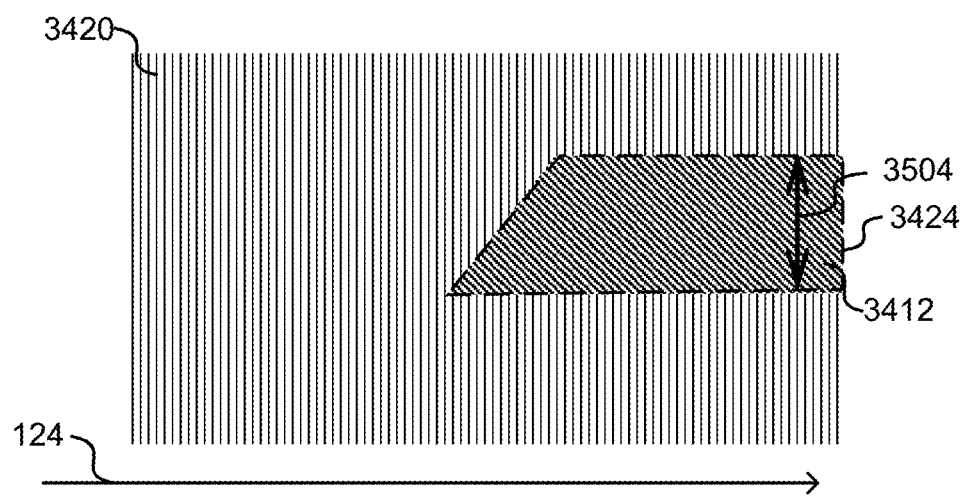

FIG. 35 is a top view of FIG. 34. In some embodiments, a width 3504 of recess 3424 is greater than a shoulder width. A width of non-crystalline silicon can be reduced to a proper width later by etching.

Figure 36:
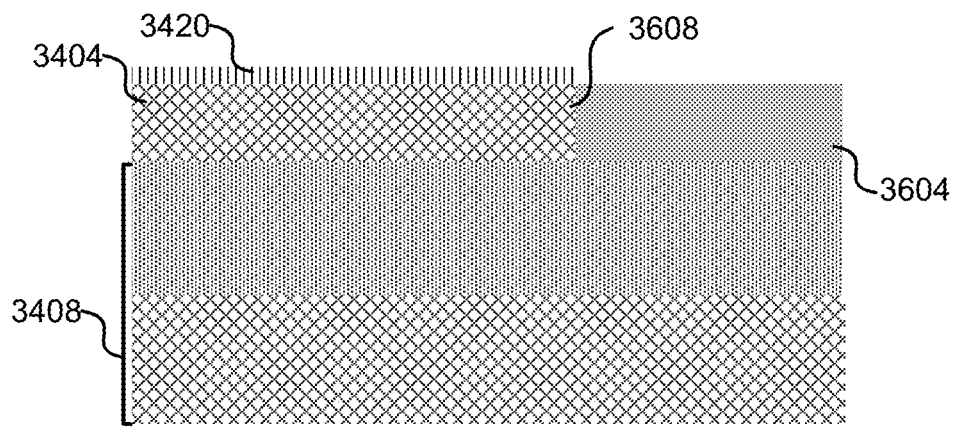
Figure 37:
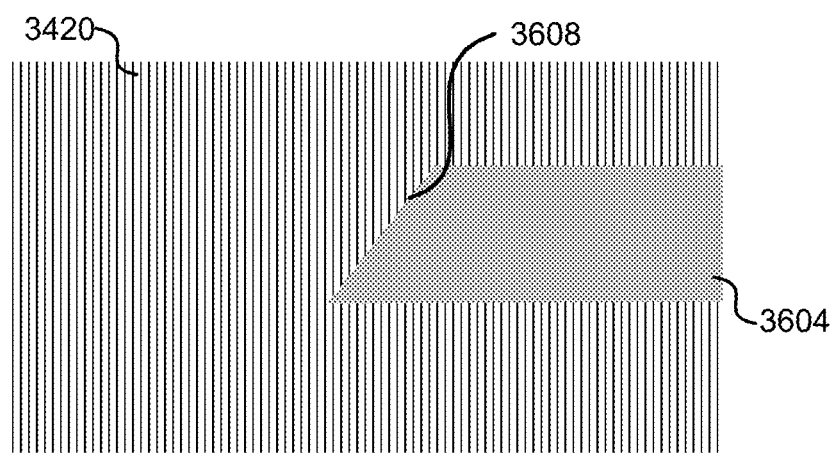

FIG. 36 is a side view of an embodiment of a device with a non-crystalline shoulder 3604. The non-crystalline shoulder 3604 is formed by filling recess 3424 with non-crystalline silicon (e.g., a-Si). FIG. 37 is a top view of FIG. 36. Excess non-crystalline silicon is removed by CMP. In some embodiments, non-crystalline shoulder 3604 is over etched so the non-crystalline shoulder 3604 has a height lower than the CMP stop 3420. An interface 3608 is formed between the non-crystalline shoulder 3604 and the device layer 3404.

Figure 38:
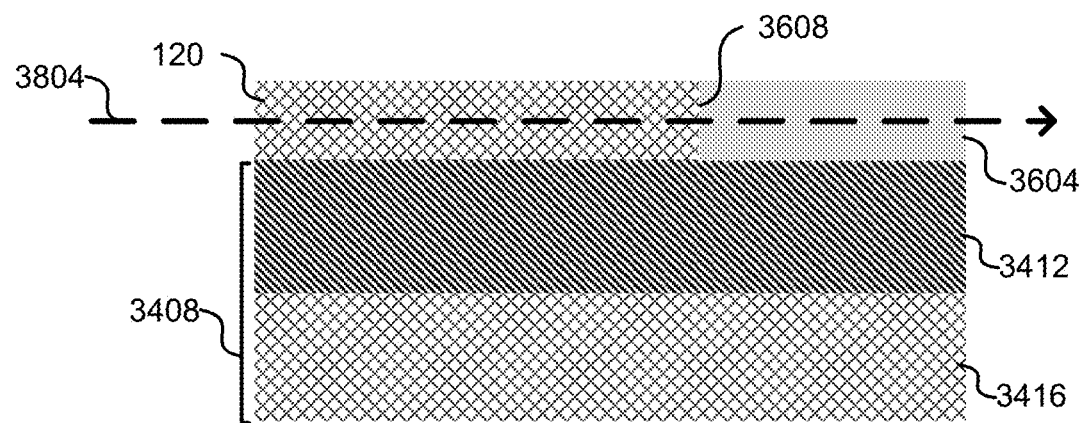
Figure 39:
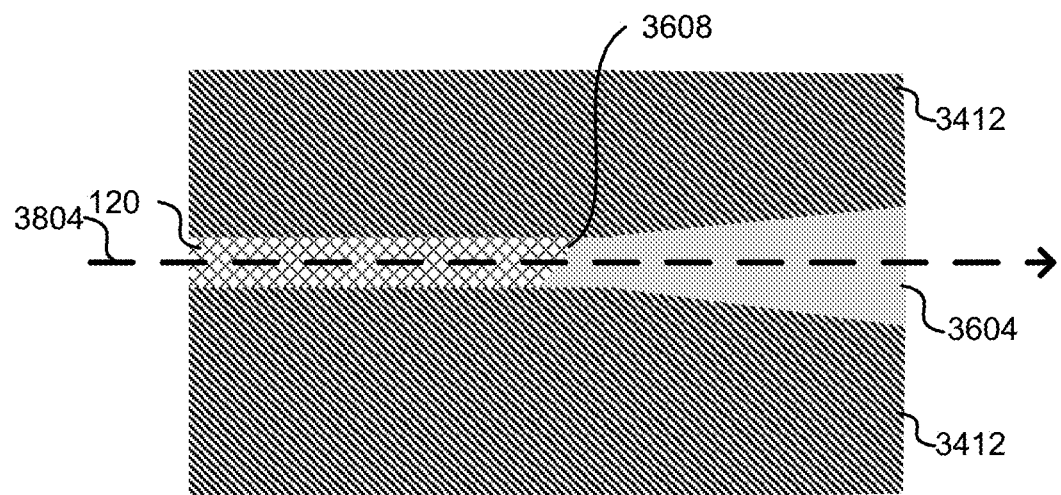

In FIGS. 38 and 39, the CMP stop 3420 is removed (e.g., by etching) and additional portions of the device layer 3404 are etched (e.g., to the BOX layer 3412) to form a waveguide 120 in the device layer 3404 and/or in the non-crystalline shoulder 3604. Edges of the non-crystalline shoulder 3604 are also formed by etching.

Light travels from the waveguide 120, through the interface 3608, and into the non-crystalline shoulder 3604. An optical path 3804 is shown by a dashed line. The interface 3608 is angled (e.g., not orthogonal to the optical path 3804) with respect to the optical path 3804 to reduce reflections in the waveguide 120 (e.g., back along the optical path 3804). But in some embodiments, the interface 3608 is perpendicular to the optical path 3804.

Figure 40:
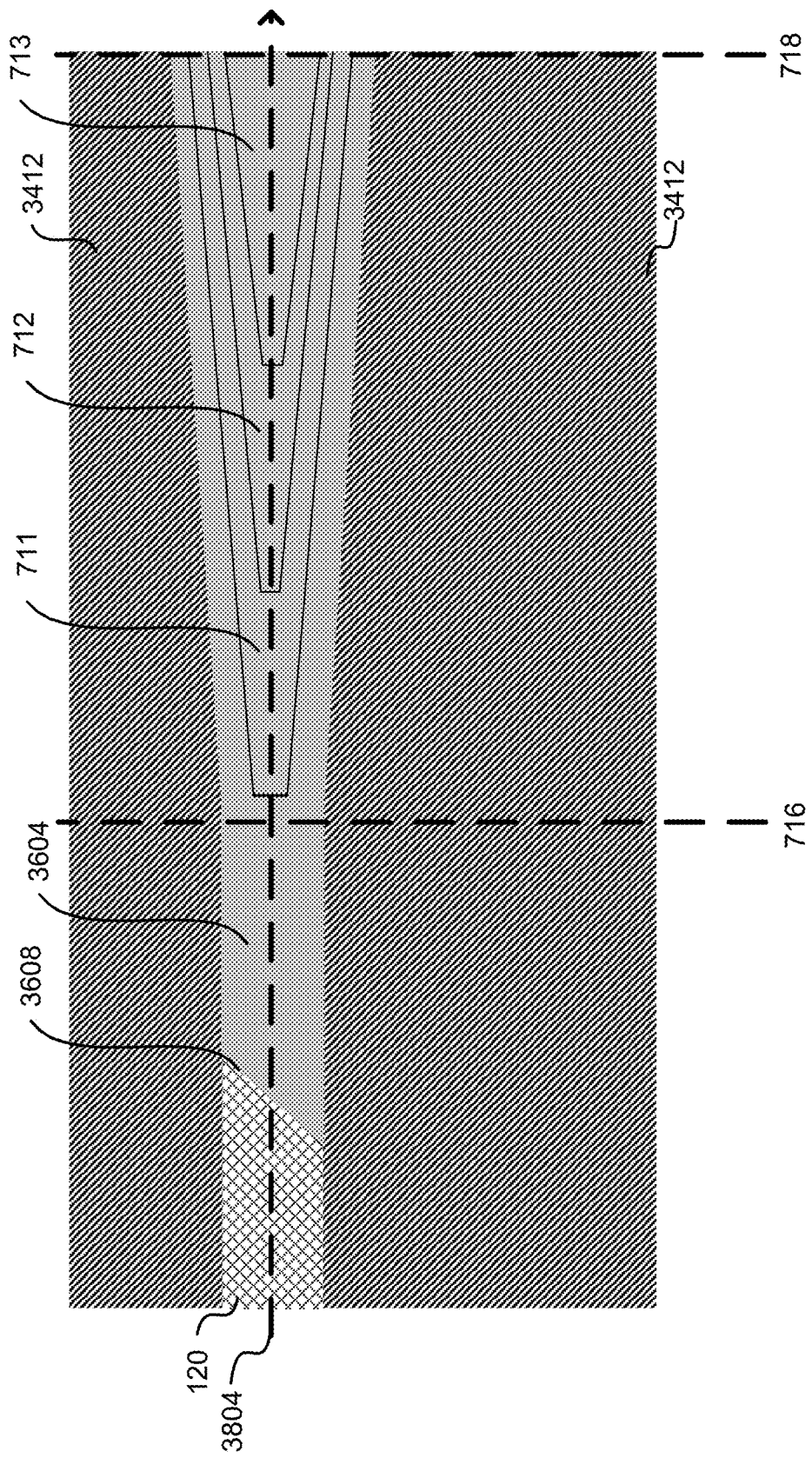
FIG. 40 depicts a top view of a three-stage mode expander with a non-crystalline silicon shoulder.

FIG. 40 shows a top view of an embodiment of the second three-stage mode expander 700-2, after additional stages are added to the non-crystalline shoulder 3604.

Figure 41:
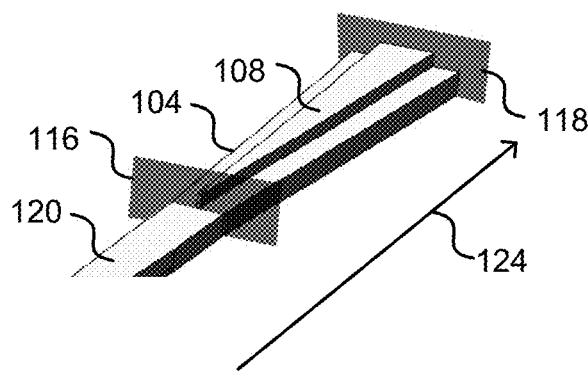
FIGS. 41-43 depict views of a single-stage mode expander with a non-crystalline silicon shoulder.
Figure 42:
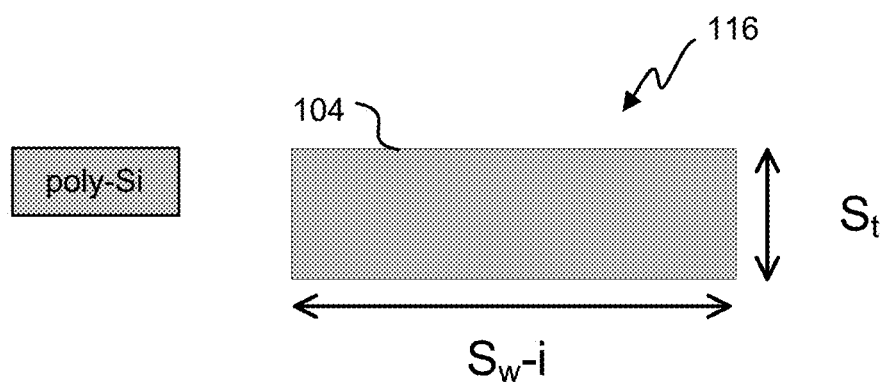
Figure 43:
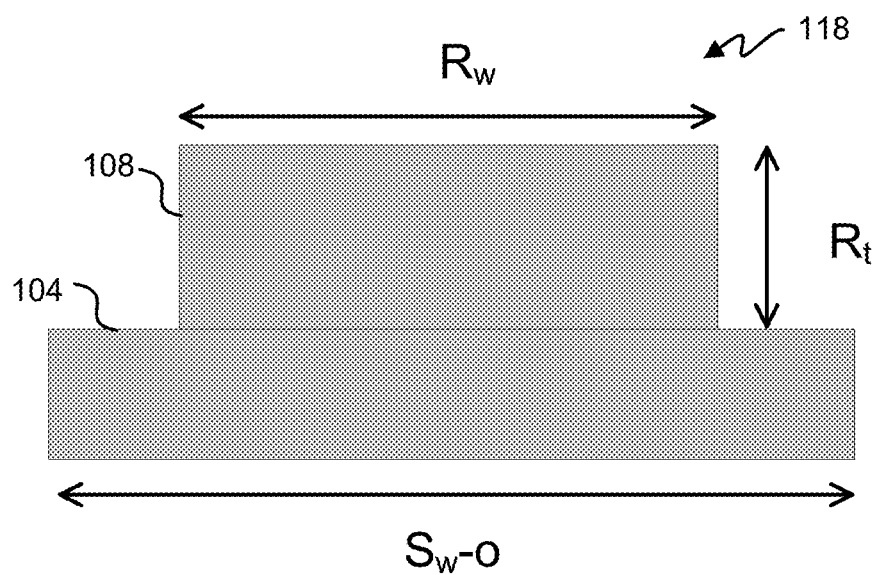

Referring to FIGS. 41-43, an embodiment of a single-stage mode expander 100 having an non-crystalline silicon shoulder is shown. FIGS. 41-43 are similar to FIGS. 1-3, except the shoulder 104 is made of non-crystalline silicon (e.g., a-Si or poly-Si) instead of crystalline-silicon as the shoulder 104 in FIGS. 2-3.

Figure 44:
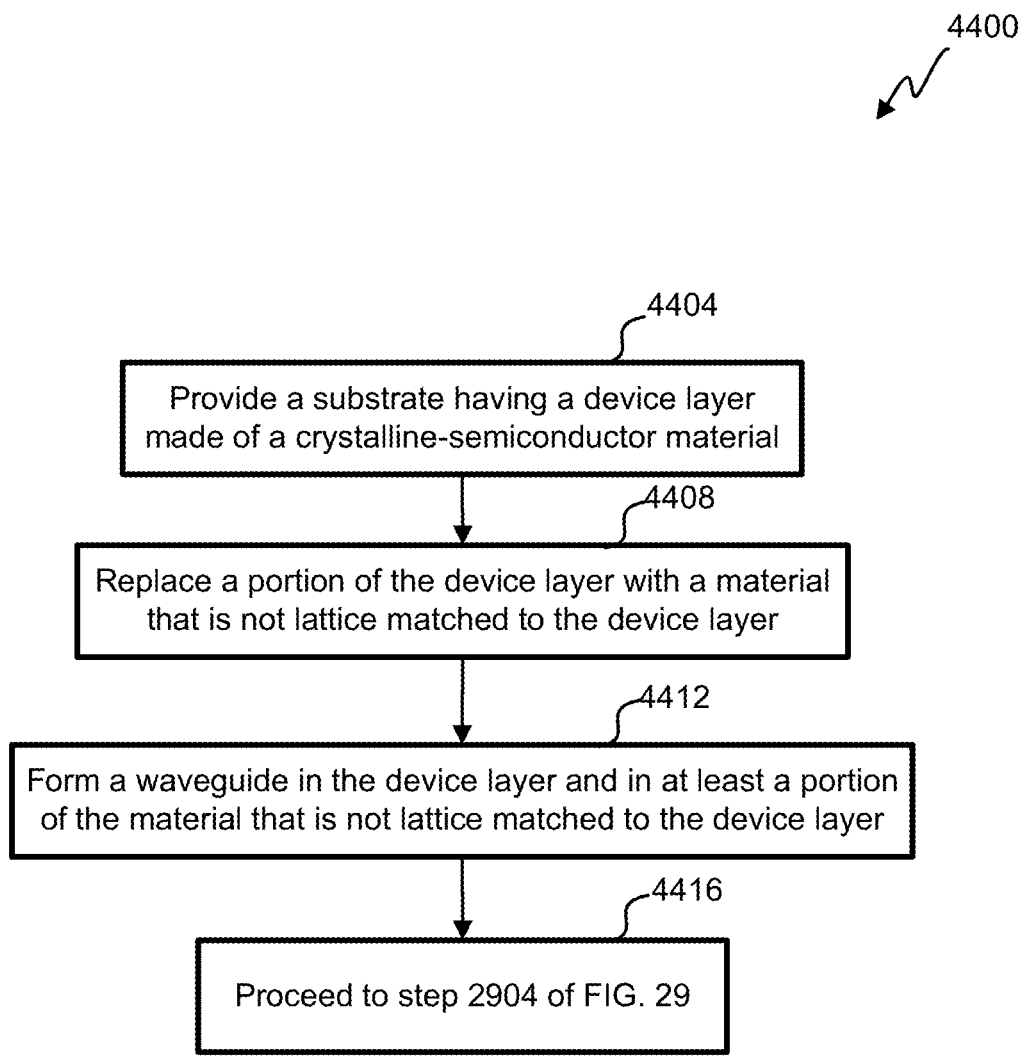
FIG. 44 shows a flowchart of an embodiment of a process for forming a non-crystalline silicon shoulder of a mode expander.

Referring next to FIG. 44, an embodiment of a process 4400 of forming a mode expander with a non-crystalline silicon shoulder is shown. Process 4400 begins in step 4404 where a substrate is provided having a device layer made of crystalline-semiconductor material (e.g., crystalline silicon). A portion of the device layer is removed and replaced with non-crystalline, semiconductor material, step 4408. The non-crystalline, semiconductor material is not lattice matched to the device layer. A waveguide is formed in the device layer and in the non-crystalline, semiconductor material, step 4412. In step 4416, process 4400 proceeds to step 2904 of FIG. 29.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. I, is not intended to be exhaustive or to limit the invention to the precise form described, and many modifications and variations are possible in light of the teaching above. For example, many of the dimensions are based on a laser wavelength of 1310 nm propagating through a mode expander. Different dimensions can be used for different wavelengths of light. For example, if a width of 5 microns is used for 1310 nm light, a width of 5.5 microns may be used for 1550 nm light. In some embodiments, a length of a stage remains constant for different wavelengths while widths and/or thicknesses change. Different dimensions can also be used when coupling to different off-chip devices, such as different types of optical fibers with different mode sizes and/or numerical apertures.

Further, all or part of a mode expander may be encapsulated in SiO2 and/or other cladding material.

Additionally, though the examples given above couple an optical mode of a silicon waveguide to an optical fiber, other features could be fabricated using similar methods as those disclosed. For example, a mode expander could be used to couple one silicon waveguide to a second, larger silicon waveguide. In another example, a first waveguide at a first height is coupled to a second waveguide at a second height (non-crystalline silicon stages being used to move a mode vertically over a horizontal distance in addition to, or instead of being used to expand or contract a size of the mode). Thus waveguides can be made to guide a beam in three dimensions. Multiple waveguides can be layered, vertically, on one chip and combined with one another. In another example, a mode expander couples a silicon waveguide to discrete optics instead of an optical fiber.

FIG. 45 depicts a side view of an example of an multistage coupler 4500 used to optically couple a first waveguide 4504-1 at a first height with a second waveguide 4504-2 at a second height. In some embodiments, both of the waveguides 4504 are semiconductor waveguides. In some embodiments, both of the waveguides 4504 are made of crystalline silicon. The multistage coupler 4500 comprises a first stage 4508-1, a second stage 4508-2, and a third stage 4508-3. Though, in some embodiments, fewer or more stages 4508 than three are used. The first stage 4508-1 is optically coupled to the first waveguide 4504-1. The second stage 4508-2 is on top of the first stage 4508-1. The third stage 4508-3 is on top of the second stage 4508-2. The third stage 4508-1 is optically coupled to the second waveguide 4504-2. The second waveguide 4504-2 is higher (vertically, e.g., farther from a substrate) than the first waveguide 4504-1.

An optical beam propagates from the first waveguide 4504-1, to the first stage 4508-1 and into the second stage 4508-2. The optical beam is guided into the second stage 4508-2, in part, because the first stage 4508-1 tapers (narrows) as the first stage 4508-1 extends away from the first waveguide 4504-1. The second stage 4508-2 has a first taper (expanding) in a direction away from the first waveguide 4504-1, which also assists in guiding the optical beam from the first stage 4508-1 into the second stage 4508-2.

The stages 4508 of the multistage coupler 4500 are manufactured similar to stages in mode expanders (e.g., using process 2900 in FIG. 29 and/or process 4400 in FIG. 44).

The optical beam is guided from the second stage 4508-2 and into the third stage 4508-3 because of an expanding taper in the third stage 4508-3 and/or a narrowing taper in the second stage 4508-2. The optical beam is coupled from the third stage 4508-3 into the second waveguide 4504-2.

FIG. 46 depicts a top view of the first waveguide 4504-1 and the first stage 4508-1. The first waveguide 4504-1 is optically coupled to the first stage 4508-1 (e.g., using an angled interface 4604). In some embodiments, the first stage 4508-1 is formed by removing a portion of the first waveguide 4504-1 (or device-layer material), similar to forming a non-crystalline silicon shoulder of a mode expander. In some embodiments, the first stage 4508-1 is not used and the second stage 4508-2 is disposed on top of the first waveguide 4504-1; light is guided into the second stage 4508-2 from the first waveguide 4504-1 because of a difference in index of refraction (e.g., similar to FIG. 31 of a mode expander having a crystalline shoulder).

FIG. 47 depicts a top view of the second stage 4508-2. The second stage 4508-2 comprises a first taper 4704-1 and a second taper 4704-2. The first taper 4704-1 expands going from the first waveguide 4504-1 toward the second waveguide 4504-2. The second taper 4704-2 narrows going from the first waveguide 4504-1 toward the second waveguide 4504-2.

FIG. 48 depicts a top view of the third stage 4508-3 and the second waveguide 4504-2. The third stage 4508-3 is optically coupled to the second waveguide 4504-2.

In some embodiments, a multistage coupler (e.g., multistage coupler 4500) for coupling a first waveguide 4504-1 with a second waveguide 4504-2 comprises a first stage 4508-1, a second stage 4508-2, and a third stage 4508-3, wherein the first stage 4508-1 is coupled with a first waveguide 4504-1; the second stage 4508-2 is, at least partially, on top of the first stage 4508-1 (e.g., farther from a substrate than the first stage 4508-1); the third stage 4508-3 is, at least partially, on top of the second stage 4508-2; the third stage 4508-3 is optically coupled to the second waveguide 4504-2; and the first stage 4508-1, the second stage 4508-2, and the third stage 4508-3 are configured to guide an optical beam (e.g., adiabatically and/or vertically) from the first waveguide 4504-1 to the second waveguide 4504-2. In some embodiments, the multistage coupler 4500 guides the optical beam horizontally as well as vertically.

In some embodiments, the first waveguide 4504-1 is made of silicon and the second waveguide 4504-2 is made of a different material, such as a III-V compound or II-VI compound (e.g., InP, GaAs). In some embodiments, the different material and the first waveguide 4504-1 are integrated on a silicon chip. For example, a III-V chip is secured on a silicon substrate as described in U.S. patent application Ser. No. 14/509,914, filed on Oct. 8, 2014.

The embodiments were chosen and described in order to explain the principles of the invention and its practical applications to thereby enable others skilled in the art to utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A multistage coupler that shifts a height of an optical beam relative to a substrate, comprising:
   the substrate, wherein the substrate defines an upper surface;
   a lower cladding layer;
   a first stage and a final stage, wherein:
      the first stage is formed of amorphous silicon or polysilicon, and has a higher index of refraction than the lower cladding layer;
      the first stage forms an input end that is configured to receive the optical beam from an input waveguide that propagates the optical beam along a propagation direction;
      the lower cladding layer is disposed between the first stage and the upper surface;
      the first stage is disposed at a first height, relative to the upper surface, from the input end to a first-stage end;
      the first stage forms a first-stage cross section, transverse to the propagation direction, that tapers along the propagation direction, wherein the first-stage end is narrower than the input end;
      the first stage is optically coupled with the final stage;
      the final stage forms an output end that is configured to transmit the optical beam into an output waveguide at a second height relative to the upper surface;
      the final stage is formed of amorphous silicon or polysilicon, and has a higher index of refraction than the lower cladding layer;
      the final stage is disposed at the second height relative to the upper surface from a final-stage end to the output end, the second height being greater than the first height;
      the final stage forms a final-stage cross section, transverse to the propagation direction, that widens along the propagation direction, wherein the output end is wider than the final-stage end;
      the input waveguide is formed of crystalline silicon, and is disposed above the lower cladding layer; and
      the input waveguide is configured to transmit the optical beam into the input end of the first stage.

2. The multistage coupler of claim 1, wherein the first-stage cross section at the input end of the first stage supports an optical mode of an initial mode size, and the final-stage cross section at the output end of the final stage supports an optical mode of a final mode size that is the same as the initial mode size.

3. The multistage coupler of claim 1, wherein the first-stage cross section at the input end of the first stage supports an optical mode of an initial mode size, and the final-stage cross section at the output end of the final stage supports an optical mode of a final mode size that is different from the initial mode size.

4. The multistage coupler of claim 1, further comprising an upper cladding layer, wherein:
   the first stage and the final stage are disposed between the upper cladding layer and the upper surface,
   the upper cladding layer has a lower index of refraction than both the first stage and the final stage.

5. The multistage coupler of claim 1, further comprising the output waveguide, wherein:
   the output waveguide is formed of crystalline silicon, a III-V compound or a II-VI compound; and
   the output waveguide is configured to receive the optical beam from the output end of the final stage.

6. A multistage coupler that shifts a height of an optical beam relative to a substrate, comprising:
   the substrate, wherein the substrate defines an upper surface;
   a lower cladding layer;
   a first stage, an intermediate stage, and a final stage, wherein:
      the first stage is formed of amorphous silicon or polysilicon, and has a higher index of refraction than the lower cladding layer;
      the first stage forms an input end that is configured to receive the optical beam from an input waveguide that propagates the optical beam along a propagation direction;
      the lower cladding layer is disposed between the first stage and the upper surface;
      the first stage is disposed at a first height, relative to the upper surface, from the input end to a first-stage end;
      the first stage forms a first-stage cross section, transverse to the propagation direction, that tapers along the propagation direction, wherein the first-stage end is narrower than the input end;
      the first stage is optically coupled with the final stage;
      the intermediate stage is formed of amorphous silicon or polysilicon, and is in direct physical contact with the first stage, with no intervening material therebetween;
      the intermediate stage is disposed at a second height relative to the upper surface;
      the second height is greater than the first height;
      the final stage forms an output end that is configured to transmit the optical beam into an output waveguide at a third height relative to the upper surface;
      the final stage is formed of amorphous silicon or polysilicon, and has a higher index of refraction than the lower cladding layer;
      the final stage is disposed at the third height relative to the upper surface from a final-stage end to the output end, the third height being greater than the second height; and
      the final stage forms a final-stage cross section, transverse to the propagation direction, that widens along the propagation direction, wherein the output end is wider than the final-stage end.

7. The multistage coupler of claim 6, wherein:
the intermediate stage defines an intermediate-stage cross section, transverse to the propagation direction, and
the intermediate-stage cross section widens or narrows along the propagation direction.

8. The multistage coupler of claim 7, wherein:
the intermediate stage defines an intermediate stage beginning, an intermediate stage middle portion and an intermediate-stage end,
the intermediate stage beginning couples optically with the first stage;
the intermediate-stage cross section forms a first taper that widens along the propagation direction from the intermediate stage beginning to the intermediate stage middle portion;
the intermediate-stage end couples optically with the final stage; and the intermediate-stage cross section forms a second taper that narrows along the propagation direction from the intermediate stage middle portion to the intermediate-stage end.

9. The multistage coupler of claim 6, wherein the final stage is in direct contact with the intermediate stage, with no intervening material therebetween, and the optical beam propagates directly from the intermediate stage into the final stage.

10. The multistage coupler of claim 6, wherein the intermediate stage comprises a first intermediate stage and a second intermediate stage, each of the first and second intermediate stages being formed of amorphous silicon or polysilicon.

11. A method of shifting a height of an optical beam relative to a substrate, comprising:
   receiving the optical beam at an input end of a multistage coupler that is coupled with the substrate, wherein the input end of the multistage coupler defines a first height relative to an upper surface of the substrate;
   propagating the optical beam through the multistage coupler, wherein the multistage coupler comprises a first stage and a final stage, and wherein:
      the first stage is disposed at the first height, relative to the upper surface, from the input end to a first-stage end,
      the first stage is formed of amorphous silicon or polysilicon, and tapers along a propagation direction that extends from the input end to the first-stage end,
      the first-stage end is narrower than the input end,
      the first stage is optically coupled with the final stage,
      the final stage is disposed at a second height relative to the upper surface from a final-stage end to an output end of the multistage coupler, the second height being greater than the first height,
      the final stage is formed of amorphous silicon or polysilicon, and widens along the propagation direction, wherein the output end is wider than the final-stage end, and
      propagating the optical beam comprises at least one of:
         propagating the optical beam from an input waveguide into the first stage at an angled interface between the input waveguide and the first stage, or
         propagating the optical beam from the final stage into an output waveguide at an angled interface between the final stage and the output waveguide; and
   transmitting the optical beam through the output end of the multistage coupler.

12. The method of claim 11, wherein receiving the optical beam at the input end of the multistage coupler comprises propagating the optical beam with an initial mode size, and transmitting the optical beam through the output end of the multistage coupler comprises propagating the optical beam with a final mode size that is the same as the initial mode size.

13. The method of claim 11, wherein receiving the optical beam at the input end of the multistage coupler comprises receiving the optical beam with an initial mode size, and transmitting the optical beam through the output end of the multistage coupler comprises transmitting the optical beam with a final mode size that is different from the initial mode size.

14. The method of claim 11, further comprising propagating the optical beam into an optical fiber, wherein the optical beam does not change in height relative to the upper surface as the optical beam propagates from the output end of the multistage coupler into the optical fiber.

15. The method of claim 11, wherein receiving the optical beam at the input end of the multistage coupler comprises transmitting the optical beam from a waveguide formed of crystalline silicon into the input end, and further comprising propagating the optical beam through the output end of the multistage coupler and into a waveguide formed of crystalline silicon.

16. The method of claim 11, further comprising propagating the optical beam through the output end of the multistage coupler and into a waveguide formed of a III-V compound or a II-VI compound.

17. The method of claim 11, wherein propagating the optical beam through the multistage coupler comprises:
   propagating the optical beam directly from the first stage into an intermediate stage, wherein:
      the intermediate stage is formed of amorphous silicon or polysilicon, and is in direct physical contact with the first stage, with no intervening material therebetween,
      the intermediate stage is disposed at a third height relative to the upper surface, and
      the third height is intermediate in height between the first height and the second height, relative to the upper surface.

18. The method of claim 17, wherein:
   propagating the optical beam through the multistage coupler comprises propagating the optical beam directly from the intermediate stage into the final stage; and
   the intermediate stage is in direct physical contact with the final stage, with no intervening material therebetween.

19. The multistage coupler of claim 1, wherein the first stage is in direct physical contact with the final stage, with no intervening material therebetween, so that the optical beam propagates directly from the first stage into the final stage.

20. The multistage coupler of claim 1, further comprising an intermediate stage between the first stage and the final stage, wherein:
   the intermediate stage is disposed at a third height relative to the upper surface, and
   the third height is intermediate in height between the first height and the second height, relative to the upper surface.

* * * * *